(12) United States Patent
Ware et al.

(10) Patent No.: US 11,755,508 B2
(45) Date of Patent: Sep. 12, 2023

(54) HIGH-PERFORMANCE, HIGH-CAPACITY MEMORY SYSTEMS AND MODULES

(71) Applicant: Rambus Inc., San Jose, CA (US)

(72) Inventors: Frederick A. Ware, Los Altos Hills, CA (US); Ely Tsern, Los Altos, CA (US); John Eric Linstadt, Palo Alto, CA (US); Thomas J. Giovannini, San Jose, CA (US); Craig E. Hampel, Los Altos, CA (US); Scott C. Best, Palo Alto, CA (US); John Yan, San Jose, CA (US)

(73) Assignee: Rambus Inc., San Jose, CA (US)

( * ) Notice: Subject to any disclaimer, the term of this patent is extended or adjusted under 35 U.S.C. 154(b) by 0 days.

(21) Appl. No.: 17/507,588

(22) Filed: Oct. 21, 2021

(65) Prior Publication Data

US 2022/0043762 A1 Feb. 10, 2022

Related U.S. Application Data

(62) Division of application No. 15/525,379, filed as application No. PCT/US2015/060057 on Nov. 11, 2015, now abandoned.

(60) Provisional application No. 62/203,279, filed on Aug. 10, 2015, provisional application No. 62/085,802, filed on Dec. 1, 2014.

(51) Int. Cl.
*G06F 13/16* (2006.01)

(52) U.S. Cl.
CPC ...... *G06F 13/1678* (2013.01); *G06F 13/1673* (2013.01); *G06F 13/1694* (2013.01)

(58) Field of Classification Search
None
See application file for complete search history.

(56) References Cited

U.S. PATENT DOCUMENTS

| 6,246,588 | B1 | 6/2001 | Kim et al. |
| 6,742,098 | B1 | 5/2004 | Halbert et al. |
| 8,866,023 | B2 | 10/2014 | Kadri et al. |
| 2002/0191480 | A1 | 12/2002 | Matsumoto et al. |
| 2004/0193821 | A1 | 9/2004 | Ruhovets et al. |
| 2008/0080261 | A1* | 4/2008 | Shaeffer ............... H01L 25/105 365/189.05 |

(Continued)

FOREIGN PATENT DOCUMENTS

KR 2008-0062640 7/2008

OTHER PUBLICATIONS

Malech, Douglas, "DDR4 LRDIMMs Unprecendented Memory Bandwidth on Samsung DDR4 LRDIMM Enabled by IDT's Register and Data Buffer", Integrated Device Technology Samsung White Paper, 2014, pp. 1-7. 7 pages.

(Continued)

*Primary Examiner* — Yaima Rigol
(74) *Attorney, Agent, or Firm* — Silicon Edge Law Group LLP; Arthur J. Behiel

(57) ABSTRACT

Described are motherboards with memory-module sockets that accept legacy memory modules for backward compatibility or accept a greater number of configurable modules in support of increased memory capacity. The configurable modules can be backward compatible with legacy motherboards. Equipped with the configurable modules, the motherboards support memory systems with high signaling rates and capacities.

12 Claims, 21 Drawing Sheets

(56) References Cited

U.S. PATENT DOCUMENTS

| | | | |
|---|---|---|---|
| 2009/0063784 A1 | 3/2009 | Gower et al. | |
| 2009/0063785 A1 | 3/2009 | Gower et al. | |
| 2009/0103372 A1 | 4/2009 | Shau | |
| 2010/0157644 A1 | 6/2010 | Norman | |
| 2010/0191894 A1* | 7/2010 | Bartley | G06F 13/1684 |
| | | | 711/E12.082 |
| 2012/0191921 A1* | 7/2012 | Shaeffer | G06F 13/4072 |
| | | | 710/316 |
| 2012/0278524 A1 | 11/2012 | Lee et al. | |
| 2013/0093459 A1 | 4/2013 | Li et al. | |
| 2013/0254495 A1 | 9/2013 | Kim et al. | |
| 2014/0208156 A1 | 7/2014 | Muralimanohar et al. | |
| 2014/0297939 A1 | 10/2014 | Perego et al. | |

OTHER PUBLICATIONS

Notification Concerning Transmittal of International Preliminary Report on Patentability dated May 15, 2017 re: Int'l Appln. No. PCT/US15/060057. 6 Pages.

Notification of Transmittal of the International Search Report and the Written Opinion of the International Searching Authority, or the Declaration dated Mar. 4, 2016 re In't'l. Appln. No. PCT/US15/060057. 14 Pages.

SK Hynix, DDR4 SDRAM Load Reduced DIMM Based on 4Gb M-die, HMA84GL7MMR4N, Preliminary release, revision 0.01, Dec. 2013, 54 pages.

Wikipedia, "DDR SDRAM," downloaded from https://en.wikipedia.org/wiki/DDR4_SDRAM on Apr. 9, 2015, 6 pages.

* cited by examiner

HIGH-PERFORMANCE, HIGH-CAPACITY MEMORY SYSTEMS AND MODULES

BACKGROUND

Memory systems commonly include a memory controller that communicates with some number of memory modules via physical connections called "channels." For data storage, memory modules include dynamic random-access memory (DRAM) components. Successive generations of DRAM components have benefitted from steadily shrinking lithographic feature sizes. Storage capacity and signaling rates have improved as a result.

One metric of memory system design which has not shown comparable improvement is the number of modules one can connect to a single channel. Adding a module to a channel increases the "load" on that channel, and thus degrades signaling integrity and limits signal rates. The number of modules per memory channel has thus eroded with increased signaling rates.

BRIEF DESCRIPTION OF DRAWINGS

FIG. 12 depicts a memory system 1200 similar to system 340 of FIG. 3F, which like-identified elements being the same or similar.

DETAILED DESCRIPTION

Figure 1A:
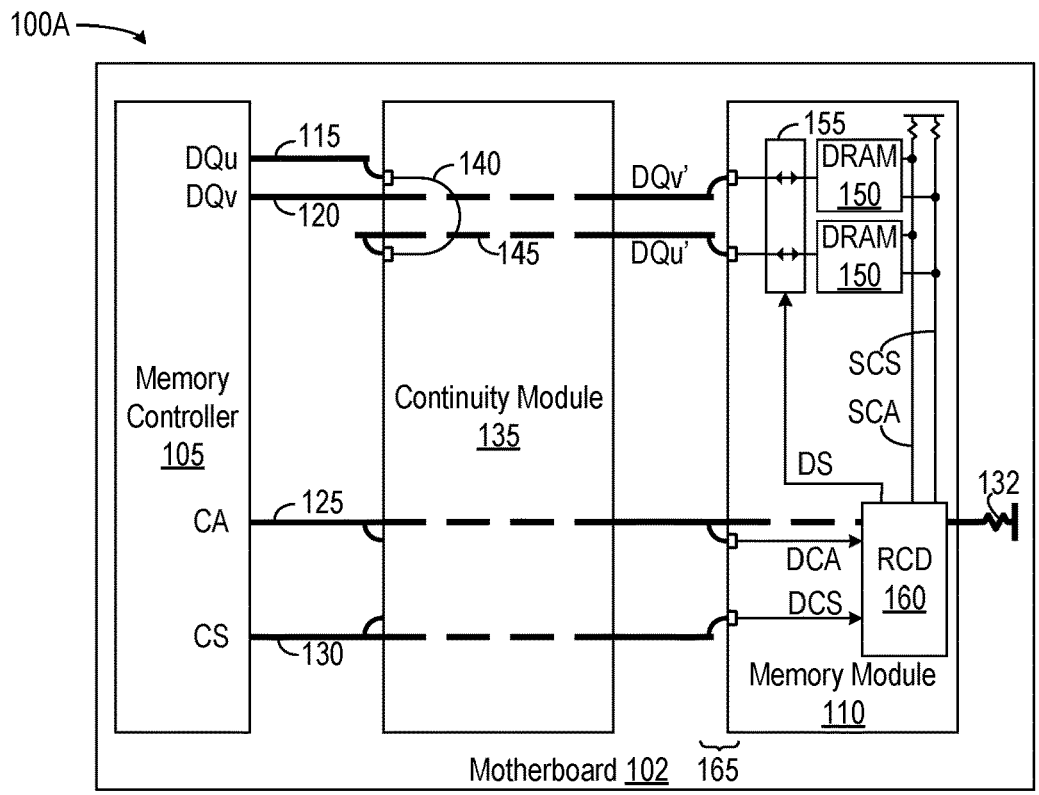
FIG. 1A depicts a memory system 100A in which a motherboard 102 supports a memory-controller component 105 that communicates with a memory module 110 via data link groups 115 and 120, a command-and-address (CA) link 125, and a chip-select link 130.

FIG. 1A depicts a memory system 100A in which a motherboard 102 supports a memory-controller component 105 that communicates with a memory module 110 via data link groups 115 and 120, a command-and-address (CA) link 125, and a chip-select link 130. Motherboard 102 includes two memory-module sockets, one of which includes module 110 and the other a continuity module 135. Continuity module 135 includes electrical traces 140 that interconnect link groups 115 from controller component 105 with motherboard traces 145 that extend between the two similar memory-module sockets. Because of continuity module 135, controller component 105 advantageously communicates with memory module 110 via point-to-point connections. As detailed below in connection with FIG. 1B, motherboard 102 and memory module 110 likewise support point-to-point data connections in a two-module configuration. Alternatively, motherboard 102 can be used with legacy memory modules, albeit with some capacity limitations to be discussed below. Resistors 132 can terminate link groups as needed to minimize signal reflections.

Module 110 includes a pair of DRAM components 150, a data-buffer component 155, and an address-buffer component 160, all of which communicate with controller component 105 via a module interface 165. (A practical embodiment will likely have far more DRAM components; this example is simplified for ease of illustration.) Address-buffer component 160, alternatively called a "Registered Clock Driver" (RCD), is coupled to command/address link group 125 and chip-select link group 130 from controller component 105 via a primary address interface DCA and primary chip-select interface DCS, respectively. Address-buffer component 160 is coupled to each DRAM component 150 via a secondary address interface SCA and secondary chip-select interface SCS, and to data-buffer component 155 via a data-steering interface DS. Damping resistors can be placed in series with and before each data-buffer component 155.

Controller component 105 communicates command and address signals CA and chip-select signals CS to initiate memory transactions (e.g., read and write transactions) with module 110. (In general, signals and their associated nodes carry the same designations. Whether a given moniker refers to a signal or a corresponding node will be clear from the context.) Address-buffer component 160 interprets (and, in many cases, retransmits to DRAM components 150) these commands, addresses, and chip-select signals as needed to respond to the controller's requests, facilitating data movement between DRAM components 150 and module interface 165 via data-buffer component 155. Point-to-point data connections facilitate fast and efficient signaling between controller 105 and memory module 110. Memory transactions and point-to-point signaling are familiar to those of skill in the art; a detailed discussion is therefore omitted for brevity.

Data-buffer component 155 includes two primary data interfaces, coupled to respective link groups 115 and 120 to communicate respective data signals DQu' and DQv', and two secondary data interfaces, one to each of the two DRAM components 150. (Each DRAM component 150 can, in some embodiments, represent a stack of DRAM die or DRAM packages, as is familiar to those of skill in the art.) Module 110 is in a full-width mode in this example, in which case address-buffer component 160 issues a data-steering signal on interface DS that causes data-buffer component 155 to provide buffered data paths between two active DRAM components 150 and respective link groups 120 and 115. In some embodiments module 110 is backward compatible with conventional memory modules and can communicate with controller 105 as a conventional memory module in the full-width mode. Motherboard 102 is also backward compatible with readily available memory modules, and can employ a conventional, full-width module in place of module 110. A full-width module can be either a fixed-width module or a variable-width module programmed to a full-width mode.

Figure 1B:
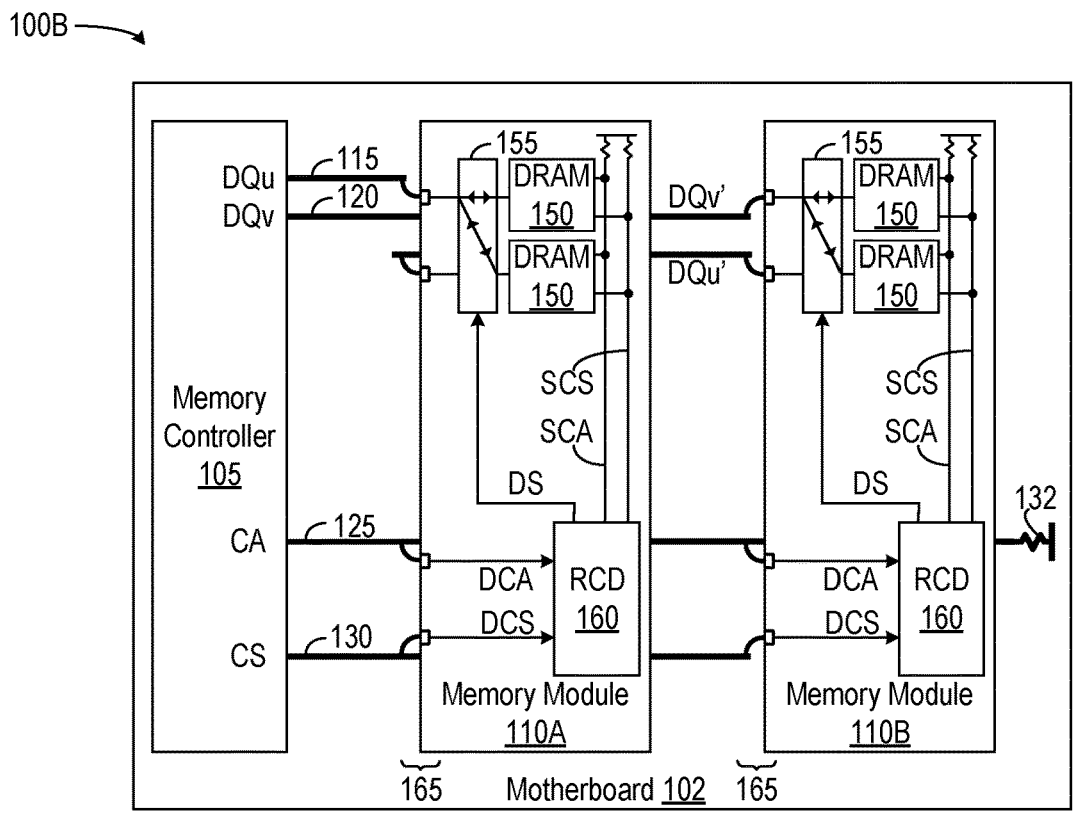
FIG. 1B depicts a memory system 100B in which the same motherboard 102 of FIG. 1A is populated with two memory modules 110A and 110B, each in a half-width mode.

FIG. 1B depicts a memory system 100B in which the same motherboard 102 of FIG. 1A is populated with two memory modules 110A and 110B, each in a half-width mode. Due to the motherboard connectivity, each module is connected to controller component 105 via only one of link groups 115 and 120. Modules 110A and 110B thus exhibit a lower load on the data link groups than systems in which two modules share the same data links.

In the half-width mode, address-buffer component 160 issues a data-steering signal DS on a like-identified interface that causes data-buffer component 155 to route all accesses to and from DRAM components 150 through the same primary data interface; the remaining primary data interface is not used. Rather than selecting both DRAM components 150 for one memory transaction, as in the full-width mode of FIG. 1A, the address-buffer component 160 on each of modules 110A and 110B selects only one DRAM component 150 for each transaction and routes data to or from the selected DRAM component via data-buffer component 155. Address-buffer components 160 control their respective steering signals DS and secondary chip-select signals SCS by decoding primary chip-select signals DCS, primary address signals DCA, or both. Address-buffer components 160 and data-buffer components 155 support the different operational modes so that DRAM components 150 can be standard, readily available memory components.

In FIGS. 1A and 1B it is assumed that DQ link groups 115 and 120 operate at or near a maximum practical signaling rate to maximize the data bandwidth between controller 105 and the module or modules 110. For both module configurations, the point-to-point connections support these relatively high data rates. The command and chip-select link groups 125 and 130 are point-to-two-point connections that operate at a lower rate.

Figure 2A:
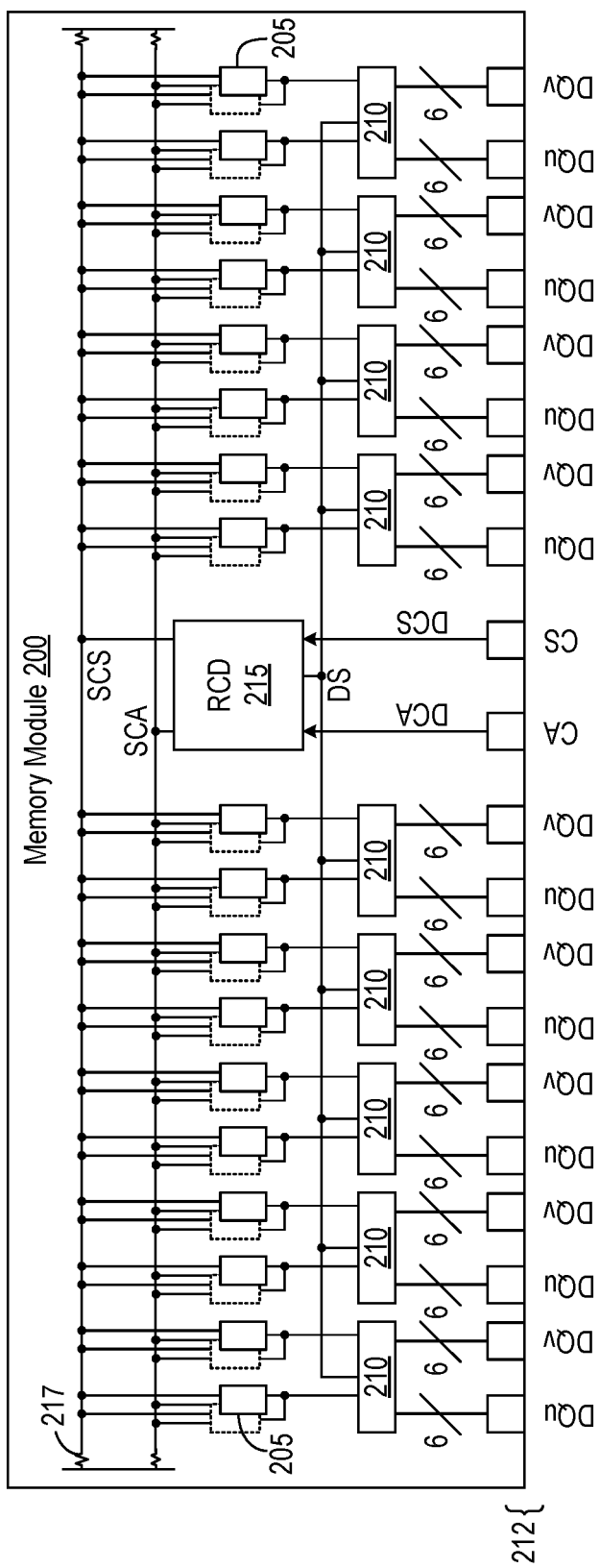
FIG. 2A depicts a configurable, variable-data-width memory module 200 in accordance with another embodiment.

FIG. 2A depicts a configurable, variable-data-width memory module 200 in accordance with another embodiment. Module 200 includes eighteen DRAM components 205 on each side, for a total of 36 components. Each DRAM component 205 may include multiple DRAM die or multiple DRAM stacked packages. Each DRAM component 205 communicates four-bit-wide (×4, or a "nibble") data in this example, as directed by an address buffer 215 that communicates with DRAM components 205 via secondary command and chip-select link groups SCA and SCS. Different data widths and different numbers of components and dies can be used in other embodiments. Resistors 217 can terminate link groups as needed to minimize signal reflections.

Module 200 includes nine data-buffer components 210, or "data buffers." Each data-buffer component 210 steers data, at the direction of steering signals DS, from four DRAM components 205 to and from two data ports DQu and DQv of a module interface 212. Each DRAM component 205 communicates ×4 data and complementary timing reference signals (e.g., strobe signals), for a total of six data-bus connections. These connections are detailed in e.g. FIG. 4 and the related text.

Address-buffer component 215 selectively interprets and retransmits command, address, and chip-select signals received on primary ports DCA and DCS to control memory components 205 and data-buffer components 210. Addresses associated with the commands identify target collections of memory cells (not shown) in components 205, and chip-select signals associated with the commands allow address-buffer component 215 to select individual integrated-circuit DRAM dies, or "chips," for both access and power-state management. A complementary clock signal (not shown) provides reference timing to module 200. Data-buffer components 210 and address-buffer components 215 each acts as a signal buffer to reduce loading on module interface 212. This reduced loading is in large part because each buffer component presents a single load to module interface 212 in lieu of the multiple DRAM dies each buffer component serves.

Data-buffer components 210 are "dual-nibble" (×8, or a "byte") buffers in this example. However, data widths and the ratio of memory components 205 to data-buffer components 210 can be different, and some or all of the steering and delay functionality attributed to data-buffer components 210 can be incorporated into the memory dies or elsewhere in memory components 205. Module interface 212 connects to one memory channel, which may be one of a number of memory channels associated with a given controller component.

Each of the nine data-buffer components 210 communicates eight-wide data for a total of 72 data bits. That is, N*64 data bits are encoded into N*72 signals, where N is an integer larger than zero (in modern systems, N is usually 1 or 2), where the additional N*8 data bits allow for error detection and correction. In particular, a ninth data-buffer component 210 and related DRAM components 205 are included in this embodiment to support eight additional bits used for error checking and correction (ECC). For example, a form of ECC developed by IBM and given the trademark Chipkill™ can be incorporated into module 200 to protect against any single memory die failure, or to correct multi-bit errors from any portion of a single memory die. Data-buffer components 210 can steer data as necessary to substitute a failed or impaired die. ECC support can be omitted in other embodiments.

Figure 2B:
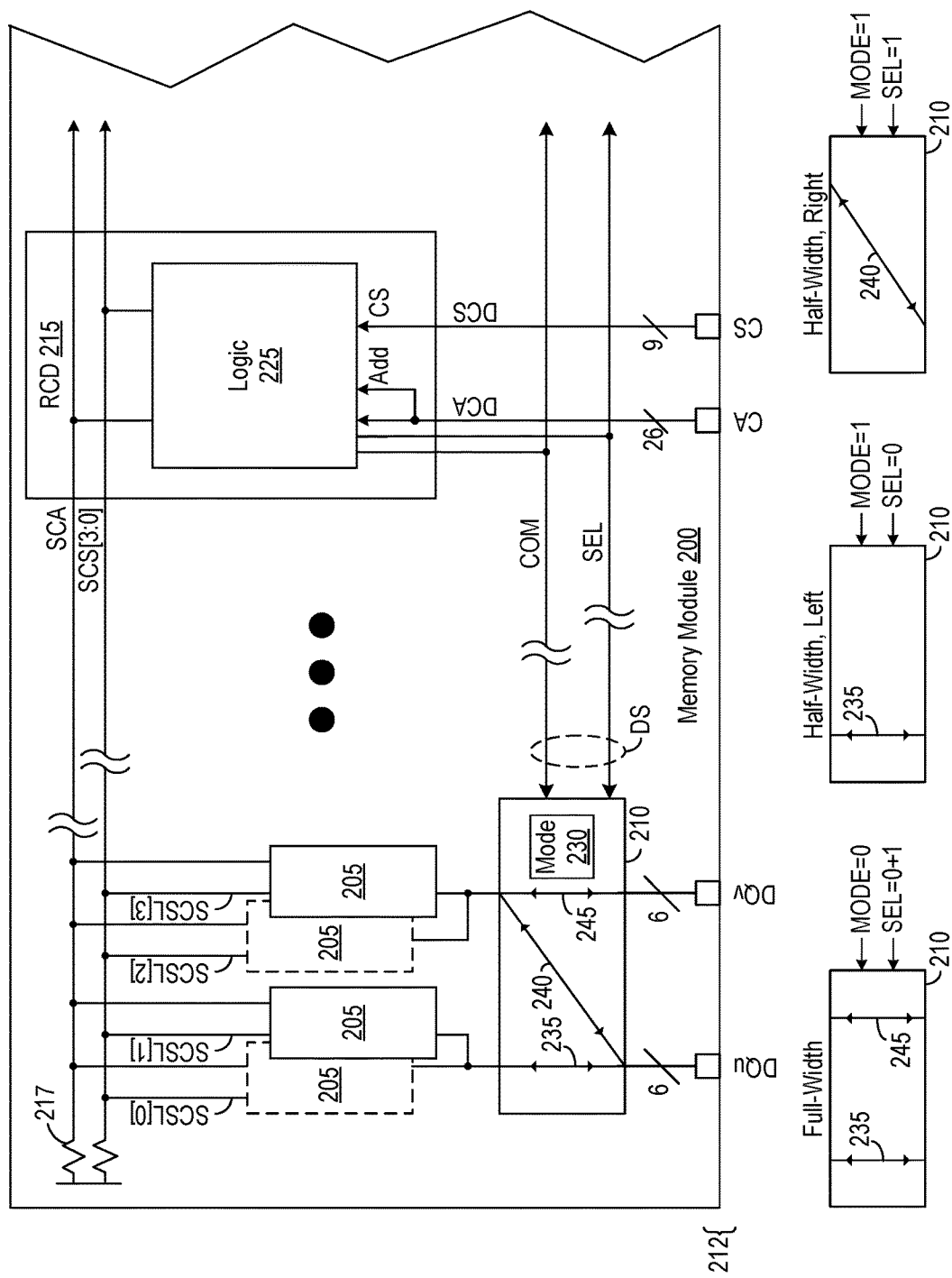
FIG. 2B depicts the left side of module 200 of FIG. 2A enlarged and edited for ease of illustration.

FIG. 2B depicts the left side of module 200 of FIG. 2A enlarged and edited for ease of illustration. In this example, module 200 is backward compatible with what is conventionally termed a "DDR4 LRDIMM chipset." DDR4 (for "double-data-rate, version 4") is a type of DRAM die, and LRDIMM (for "load-reduced, dual inline memory module") is a type of memory module that employs a separate system of buffers to facilitate communication with the memory dies. Those of skill in the art are familiar with both DDR4 memory and LRDIMM modules, so detailed treatments of these technologies are omitted here. The following discussion highlights aspects of DDR4 LRDIMM circuitry relevant to certain improvements.

Data-buffer components 210 are disposed across the bottom of module 200 to minimize stub lengths and concomitant skew between data bits. Data-buffer components 210 provide load isolation for read, write, and strobe signals to and from components 205, and each receives a communication signal COM and select signal SEL that together direct the steering of data between DRAM component 205 and module interface 212.

The operation of module 200 is consistent with that of LRDIMM server components that employ DDR4 memory. Briefly, address-buffer component 215 ("RCD" for "registering clock driver" in the figure) registers and re-drives signals from the memory controller to access DRAM components 205. Address-buffer component 215 selectively interprets and retransmits commands (e.g., in a manner consistent with the DDR4 Specification) and conveys corresponding commands to DRAM components 205 via secondary command and chip-select interfaces SCA and SCS [3:0]. The signals for secondary interfaces SCA and SCS[3:0] are specific to the installed memory dies, and the timing, format, and other parameters of those signals are specified for commercially available dies in a manner well understood by those of skill in the art.

Address-buffer component 215 serves multiple secondary chip-select links SCS[3:0] to separately select components 205. Address-buffer component 215 includes logic 225 to direct primary chip-select information arriving via primary chip-select interface DCS to these secondary chip-select interfaces.

Module 200 supports the full-width (byte-wide) and half-width (nibble-wide) modes introduced in connection with FIG. 1. Data-buffer component 210 is illustrated with each of three possible connections, a first connection 235 used in full- and half-width modes, a second connection 240 used only in the half-width mode, and a fourth connection 245 used only in the full-width mode. Register 230 can be loaded by logic 225 during system initialization. In other embodiments, register 230 is located elsewhere (e.g., in component 215).

Three depictions of data-buffer component 210 across the bottom of FIG. 2B illustrate the different connectivities associated with the modes. In the full-width mode, logic 225 issues a command via interface COM to set the contents of mode register 230 to zero. In this mode, connections 235 and 245 together convey byte-wide data DQu/DQv between a selected pair of DRAM components 205 and module interface 212, irrespective of the value of select signal SEL from logic 225. Logic 225 derives secondary signals SCA and SCS[3:0] from primary signals DCA and DCS to read and write byte-wide data from and to components 205. In the half-width mode, logic 225 causes data-buffer component 210 to load a one into mode register 230. Logic 225 then directs information received on primary chip-select interface DCS to secondary chip-select interface SCS to enable a subset of components 205. Logic 225 additionally decodes address and chip-select signals Add and CS to selectively assert select signal SEL to data-buffer component 210. If signal SEL is a logic zero, data-buffer component 210 directs nibble-wide data to and from one of the left-side components 205; if signal SEL is a logic one, data-buffer component 210 directs nibble-wide data to and from one of the right-side components 205. Two modules in the half-width mode can be used together to provide byte-wide data in the manner discussed in connection with FIG. 1B. Signal SEL need not be generated by logic 225. The equivalent information can be conveyed to data-buffer components 210 by encoding this information in the command sequence transmitted across the COM bus.

Figure 3A:
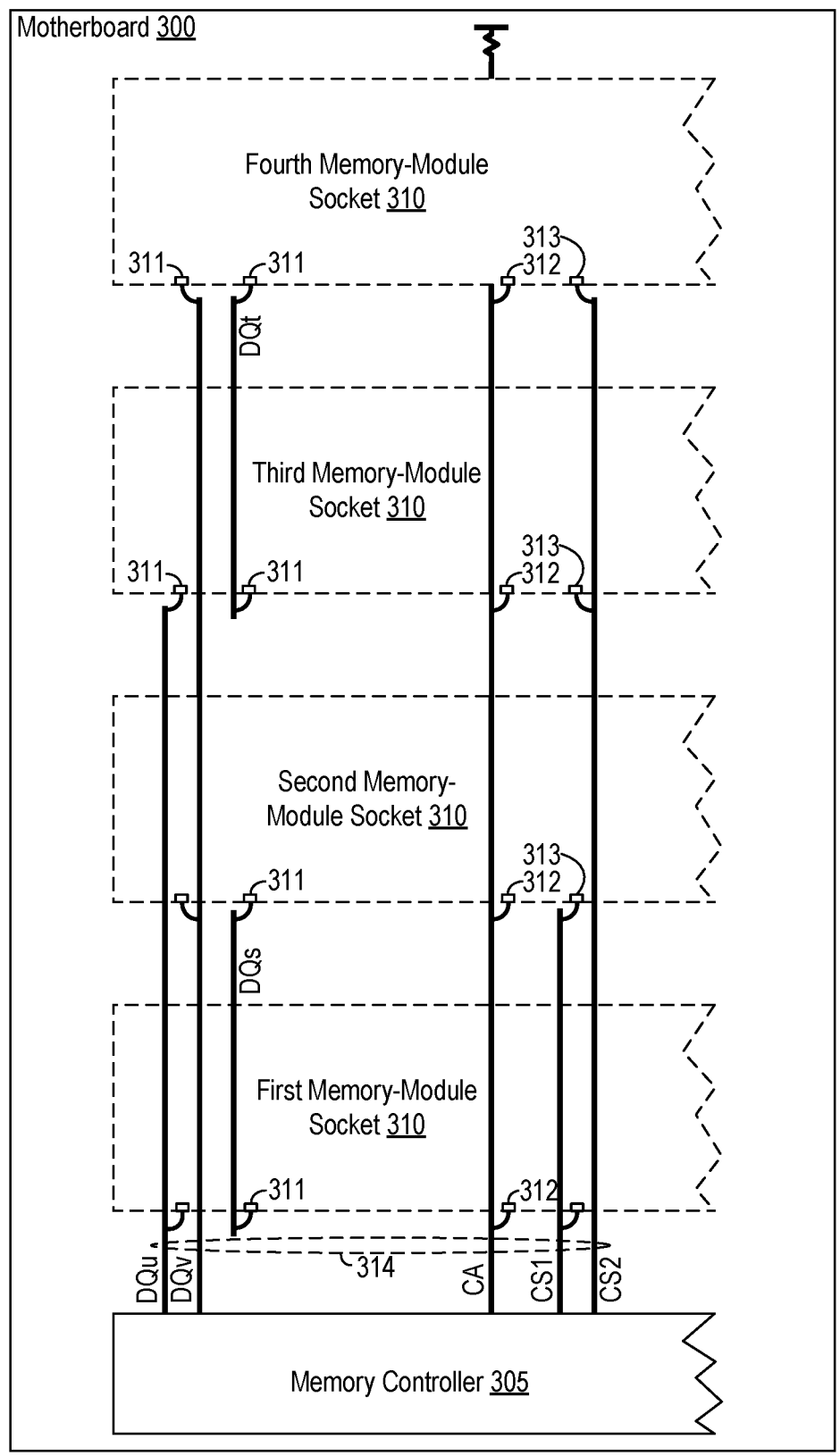
FIG. 3A depicts a motherboard 300 in accordance with another embodiment.

FIG. 3A depicts a motherboard 300 in accordance with another embodiment. As detailed below, motherboard 300 supports memory systems in which each channel of a memory controller communicates with up to four modules, but each DQ link group connects to at most two memory modules. Alternative names for motherboard 300 include mainboard, system board, or logic board.

Motherboard 300 includes a memory controller 305 and first, second, third, and fourth memory-module sockets 310, or "connectors." Sockets 310 have similar collections of pin groups that provide physical connectivity to installed memory or connectivity modules. The number of pin groups on each socket, reduced here for ease of illustration, includes data pin groups 311, a command pin group 312, and a chip-select pin group 313.

Motherboard 300 connects controller 305 to each socket 310 via DQ (data) link groups DQu, DQv, DQs, and DQt; a CA (command and address) link group CA, and two CS (chip select) link groups CS1 and CS2. These signals and their respective conductors are collectively part of one memory "channel" 314. Each DQ link group has four DQ data links (a nibble), and one complementary timing link (e.g., a strobe signal DQS), for a total of six wired connections. A full memory channel includes additional pairs of similar DQ link groups, and motherboard 300 may include additional channels, but these resources are omitted here for ease of illustration.

Link group DQu connects controller 305 to corresponding pin groups 311 on the first and third module sockets 310, and link group DQv extends from controller 305 to the second and fourth module sockets 310. Link groups DQs and DQt are not connected to controller 305; rather, link group DQs extends between pin groups 311 on the first and second sockets 310 and link group DQt between the third and fourth. Socket connections are denoted by curved segments between the link groups and sockets.

Link group CA extends to all four sockets 310 and includes twenty-six links: eighteen A (address), two BA (bank address), two BG (bank group), one ACT (activate), one PAR (parity), and a complementary CLK (clock). Chip-select link group CS1 extends to the first and second module sockets 310, and link group CS2 to the third and fourth. Each of chip-select links CS1 and CS2 includes nine links, including five CS (chip select), two ODT (on-die termination), and two CKE (clock enable). The primary CS and CA links operate at one quarter or one half the signaling rate of the DQ link groups. Each of these links is terminated with resistive devices that are matched to or higher than the characteristic impedance of the link. The resistive devices can be passive resistors on motherboard 300 or on a module, or can be active ODT devices that are fabricated in the interface circuitry of integrated-circuit components on the modules or elsewhere.

Figure 3B:
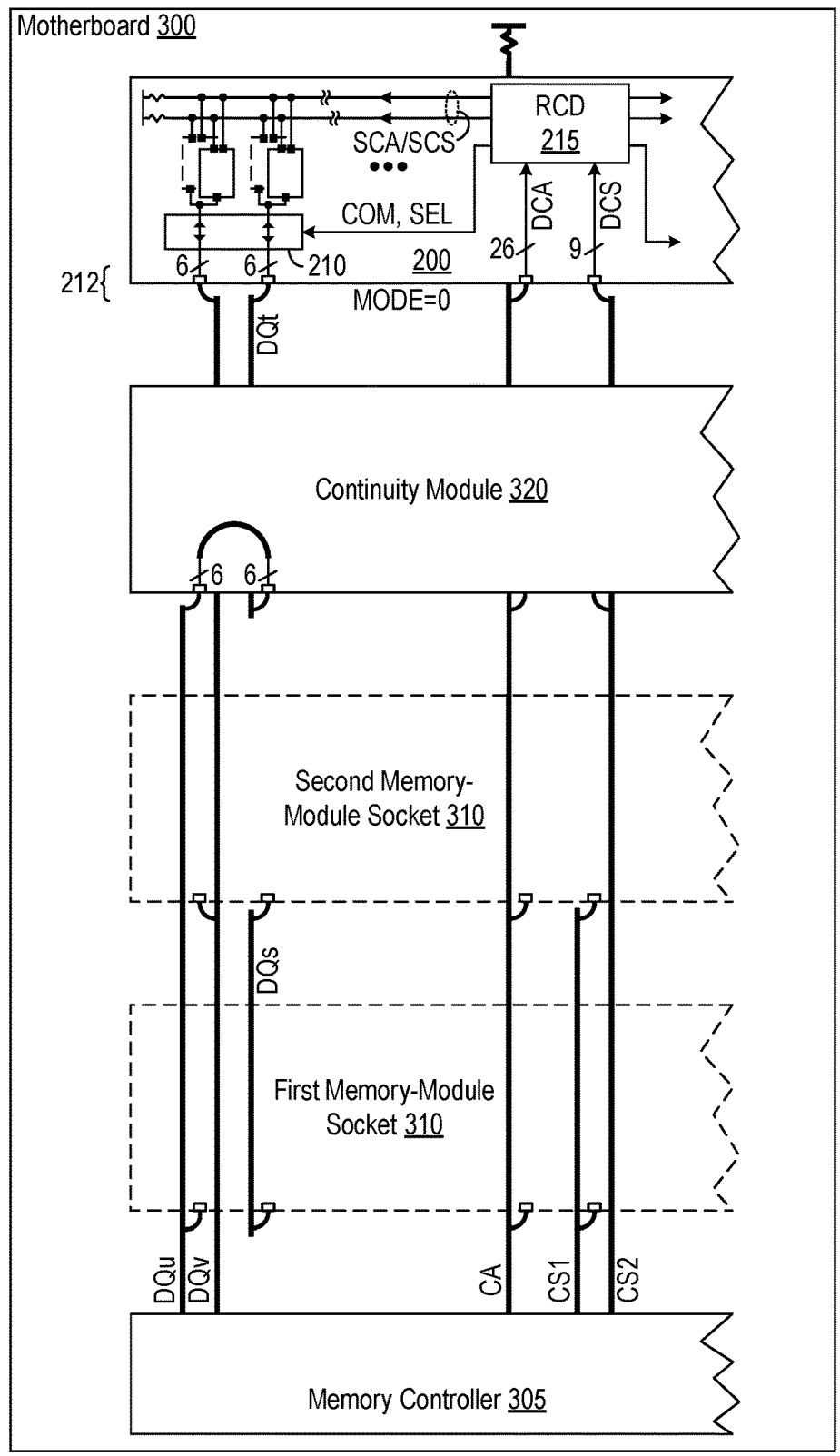
FIG. 3B depicts a memory system 315 with a single memory module 200 installed in one of the memory-module sockets 310 of motherboard 300 of FIG. 3A.

FIG. 3B depicts a memory system 315 with a single memory module 200 installed in one of the memory-module sockets 310 of motherboard 300 of FIG. 3A. Module 200 is statically configured at initialization to enter the full-width mode. Configuration is accomplished by setting a configuration field in mode register 230, but can also be done using e.g. a configuration pin. Control register 230 can be loaded by a slow signal interface (an SPD bus, an I2C bus, or something similar), or it can be loaded by a high-speed bus (the CA, CS, or DQ link groups).

Memory controller 305 connects directly to module interface 212 of module 200 via data link group DQv. A continuity module 320 connects link groups DQu and DQt in series to establish a second set of data connections between controller 305 and interface 212. Command-and-address link group CA and chip-select link group CS2 connect directly to the fourth socket, and thus to installed module 200. Controller 305 is thus able to communicate byte-wide data with module 200. Motherboard 300 is compatible with legacy LRDIMM modules, which can be used in place of module 200 to provide byte-wide data via each DQu/DQv link-group pair.

Figure 3C:
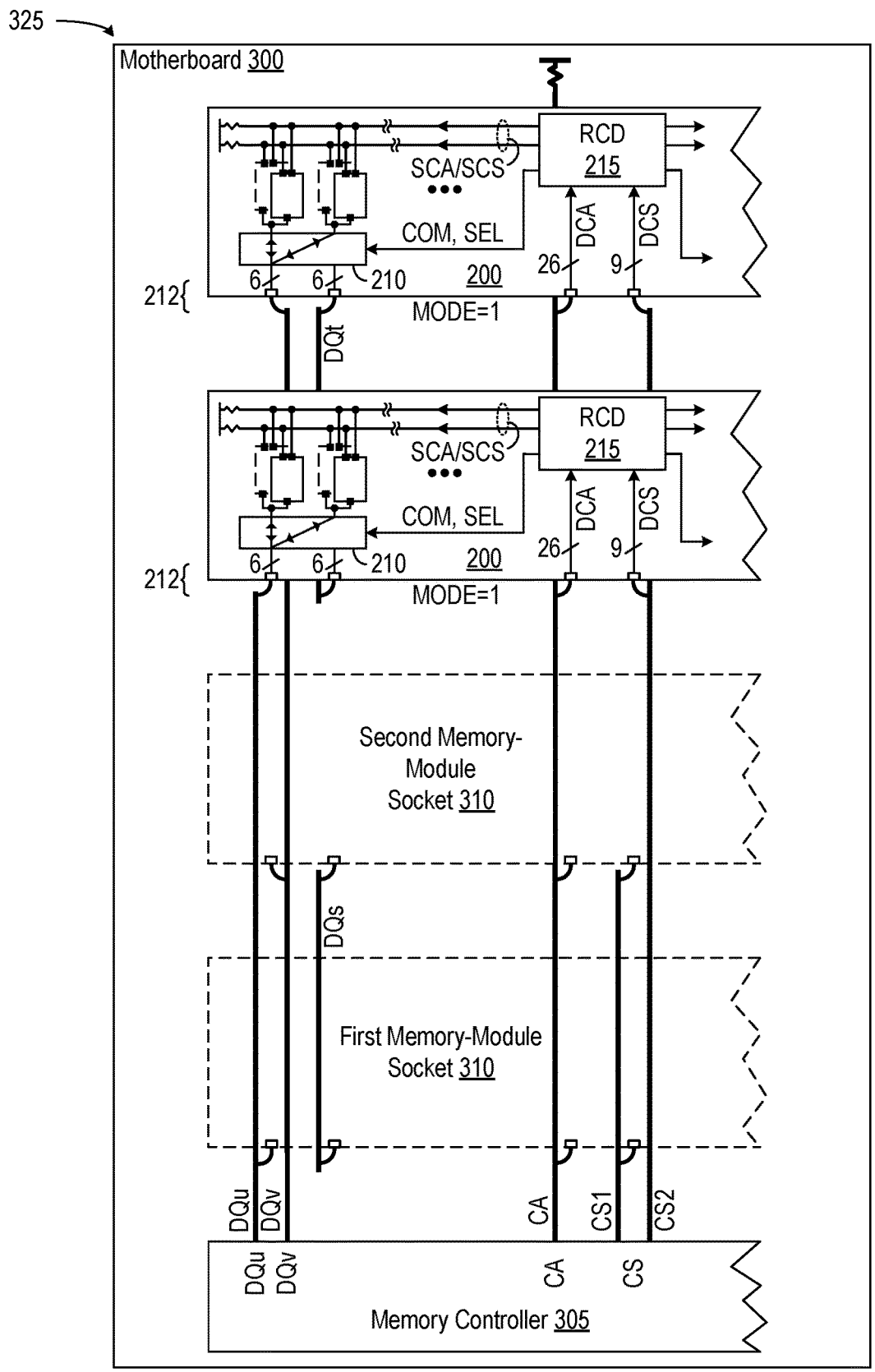
FIG. 3C depicts a memory system 325 with two memory modules 200 installed, one in each of the third and fourth sockets 310 of motherboard 300.

FIG. 3C depicts a memory system 325 with two memory modules 200 installed, one in each of the third and fourth sockets 310 of motherboard 300. Each module 200 is statically configured at initialization to enter the half-width mode. Memory controller 305 connects directly to module interface 212 of the nearest module 200 via data link group DQu, and to module interface 212 of the far module 200 via data link group DQv. Link groups CA and CS each connects to both modules 200. Controller 305 is thus able to communicate nibble-wide data with each module 200 concurrently, for combined byte-wide data via each DQu/DQv link-group pair.

Memory controller 305 is assumed to be compatible with legacy memory systems in this example. Changes to system BIOS (basic input/output system) firmware may be required to configure modules 200 during system initialization and calibration to distinguish between the half-width and full-width modes.

Figure 3D:
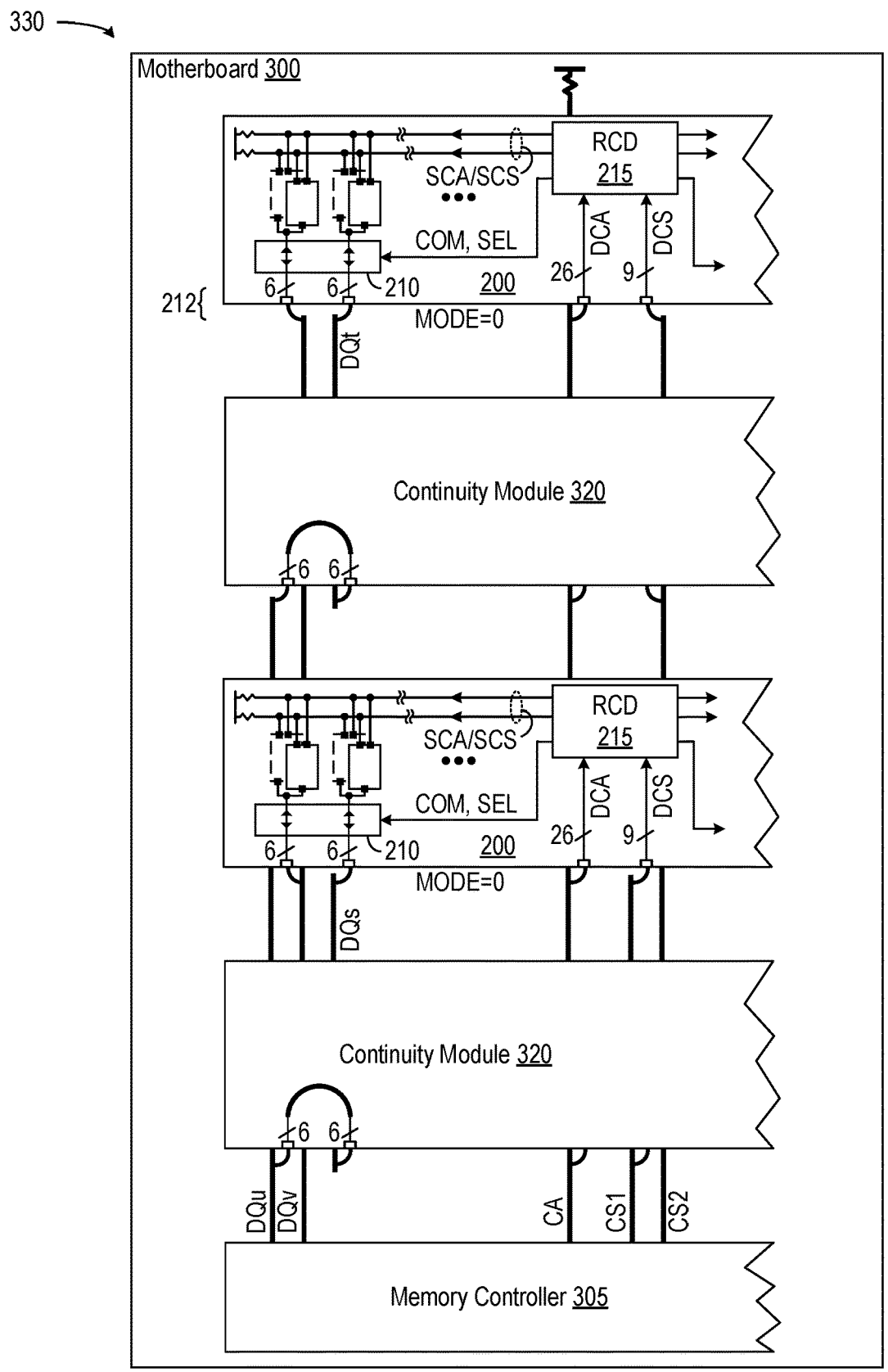
FIG. 3D depicts a memory system 330 with two memory modules 200 installed, one in each of the second and fourth sockets 310 of motherboard 300.

FIG. 3D depicts a memory system 330 with two memory modules 200 installed, one in each of the second and fourth sockets 310 of motherboard 300. Each module 200 is statically configured at initialization to enter the full-width mode. Alternatively, one or both modules 200 can be a legacy LRDIMM module. In either case, link group DQu connects memory controller 305 to the far memory module 200 via DQ link group DQt and a continuity module 320, and to the near memory module 200 via DQ link group DQs and a second continuity module 320; and link group DQv connects memory controller 305 directly to both memory modules. In effect, both memory modules 200 are connected to a common, byte-wide DQ bus. Command and address link group CA connects to both modules, and chip-select link groups CS1 and CS2 connect controller 305 to the near and far modules 200, respectively.

Figure 3E:
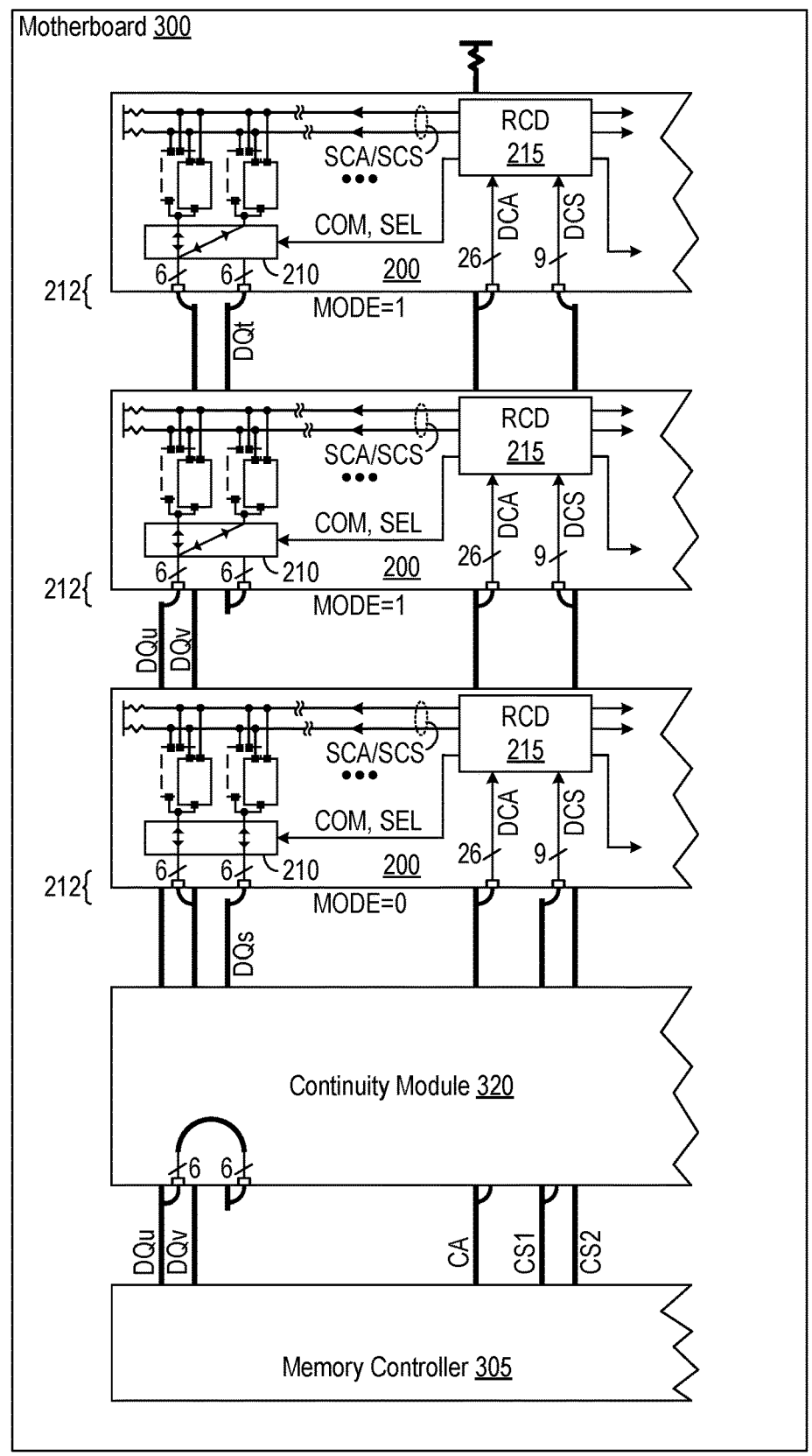
FIG. 3E depicts a memory system 335 with a continuity module 320 installed in the nearest socket and three memory modules 200 installed in the remaining three.

FIG. 3E depicts a memory system 335 with a continuity module 320 installed in the nearest socket and three memory modules 200 installed in the remaining three. The module 200 nearest controller 305 is configured at initialization to enter the full-width mode; the remaining two modules 200 are configured in the half-width mode. The two topmost, half-width modules 200 are paired together to collectively communicate byte-wide data. A continuity module 320 provides signals DQu to the full-width module.

Figure 3F:
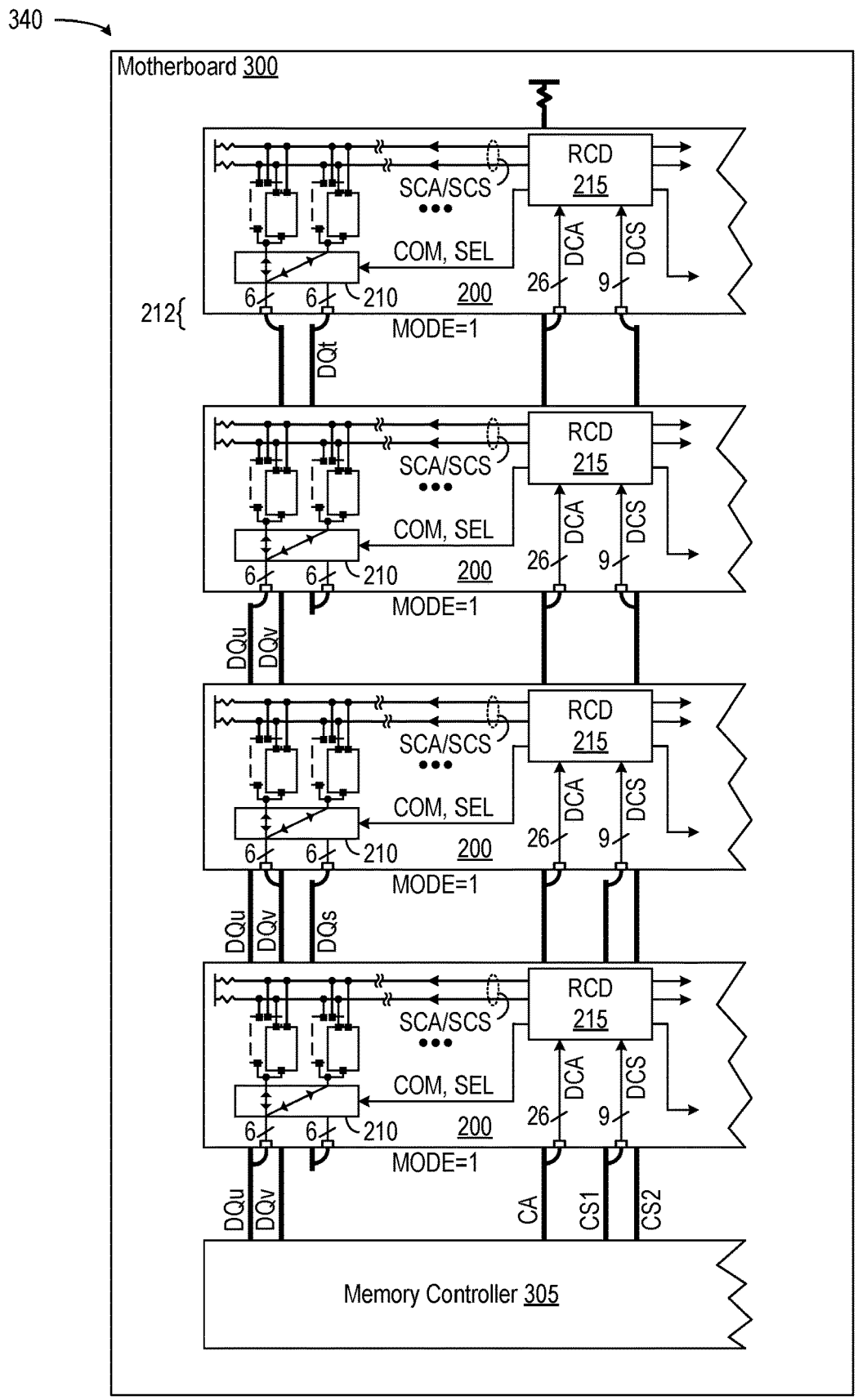
FIG. 3F depicts a memory system 340 with four installed memory modules 200, each of which is configured at initialization to the half-width mode.

FIG. 3F depicts a memory system 340 with four installed memory modules 200, each of which is configured at initialization to the half-width mode. The two topmost modules 200 are paired together to collectively communicate byte-wide data, as are the two bottommost modules. Each pair of modules exhibits a lower load on the data link groups than system in which four modules share the same data links.

Figure 3G:
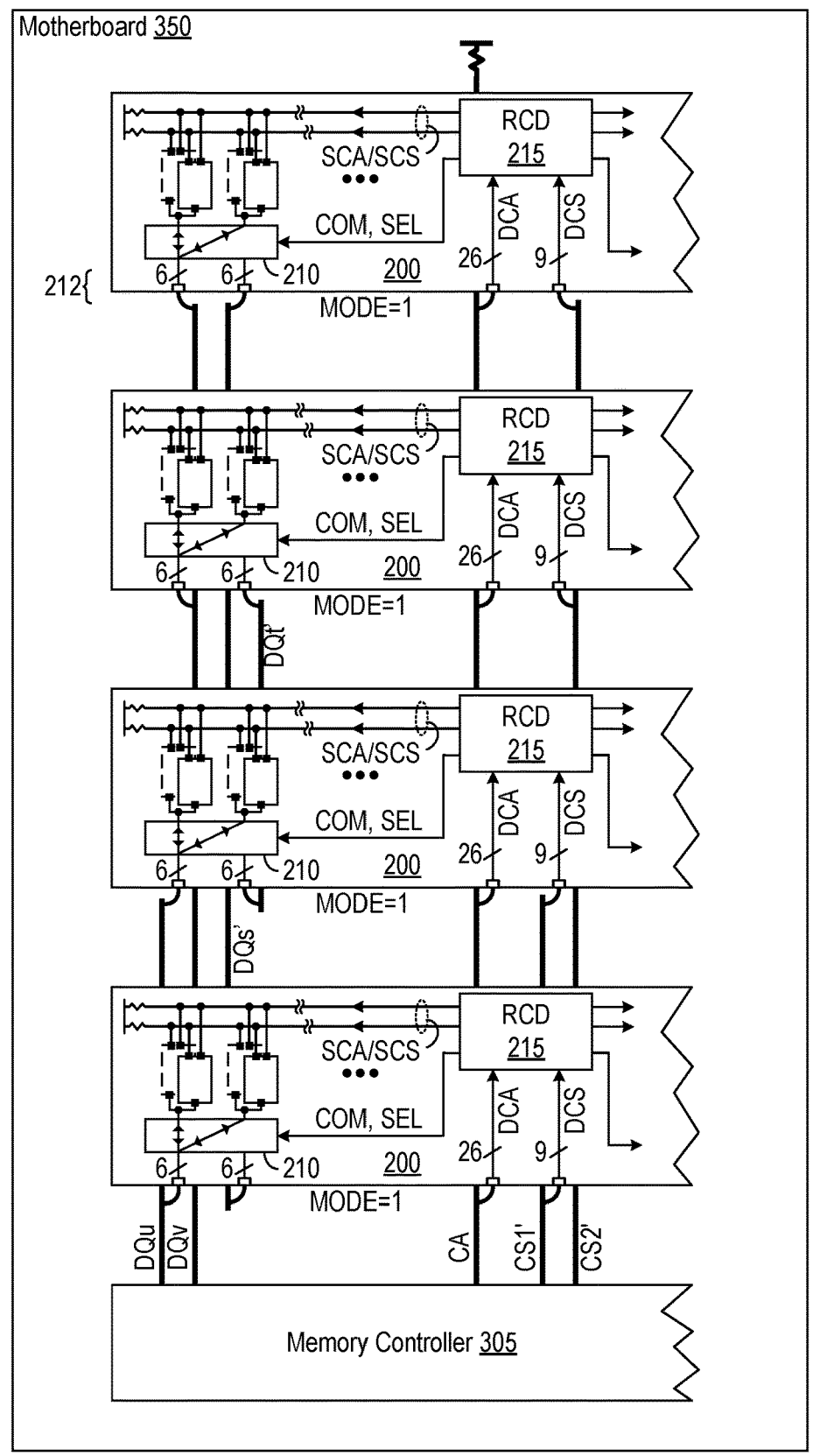
FIG. 3G depicts a memory system 345 that employs an alternative motherboard wiring pattern.

FIG. 3G depicts a memory system 345 that employs an alternative motherboard wiring pattern. In this example, system 345 includes four installed memory modules 200, each of which is configured at initialization to the half-width mode. Memory system 345 is similar to system 340 of FIG. 3F, except system 345 is based on a motherboard 350 in which data link groups DQs' and DQt' respectively connect the outermost module sockets and the innermost sockets. CS link groups CS1' and CS2' respectively direct chip-select signals to the two outermost and two innermost module sockets.

The wiring topology of motherboard 350 provides approximately half the length of the partially terminated stub seen from the inner DIMMs compared to FIG. 3F on DQu and DQv nets. The reduction in this stub leads to improved signal integrity and higher possible data transfers along the bus.

Figure 3H:
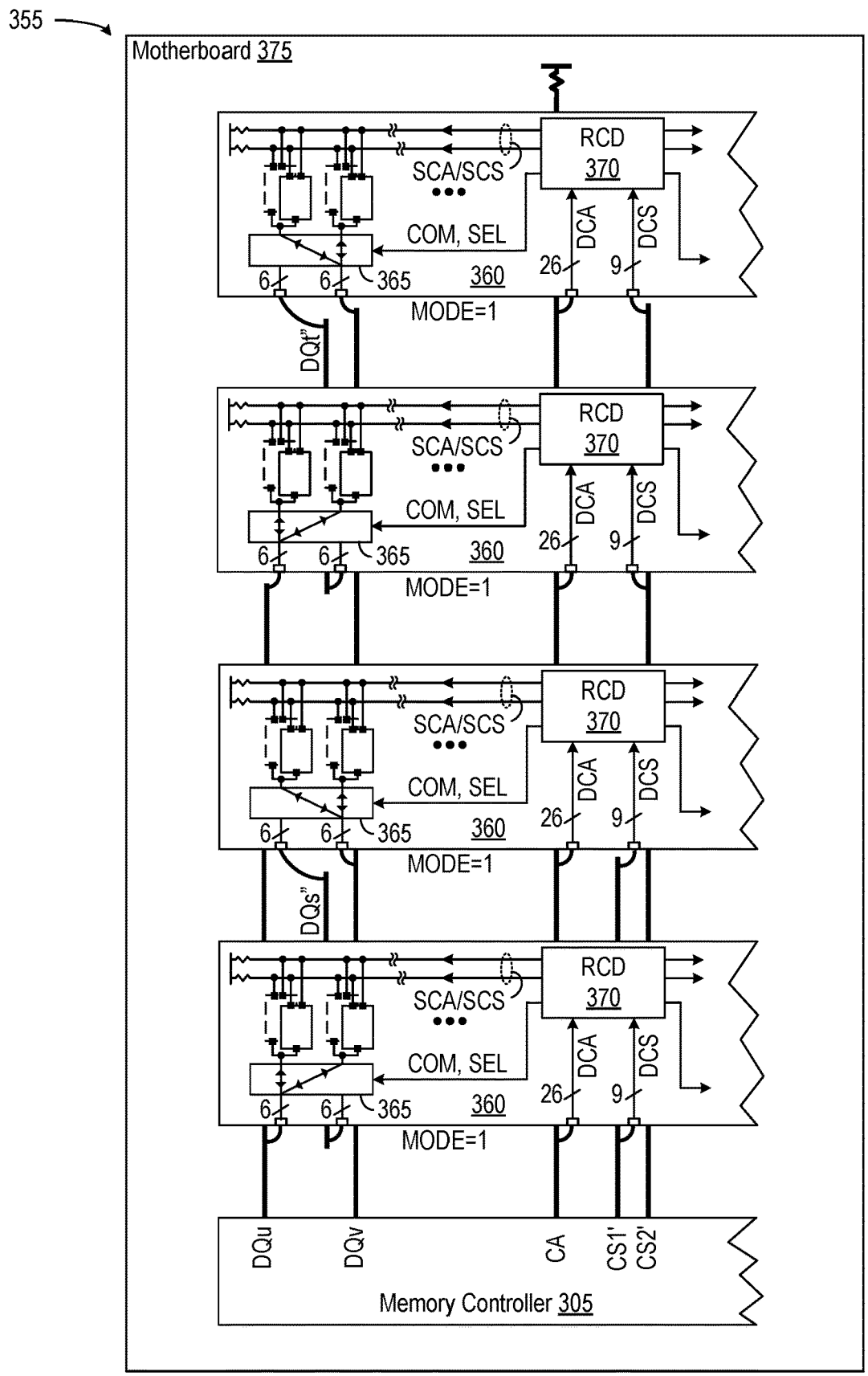
FIG. 3H depicts a memory system 355 that employs another alternative motherboard wiring pattern.

FIG. 3H depicts a memory system 355 that employs another alternative motherboard wiring pattern. In this example, system 355 includes four installed memory modules 360, each of which is configured at initialization to the half-width mode. Memory modules 360 are similar to module 200 but include data-buffer components 365 and address-buffer components 370 that can steer data to either the low- or high-order nibbles. The motherboard 375 include a data link group DQs" that interconnects the two module sockets closest to controller 305 and a data link group DQt" that interconnects the two sockets farthest from controller 305. Link groups DQs" and DQt" can be used with connectivity modules, in the manner detailed previously, to provide connectivity in systems with fewer than four modules. Modules 360 can be statically configured at initialization to steer the data as needed. Other functionally equivalent motherboard wiring topologies can be used.

Figure 3I:
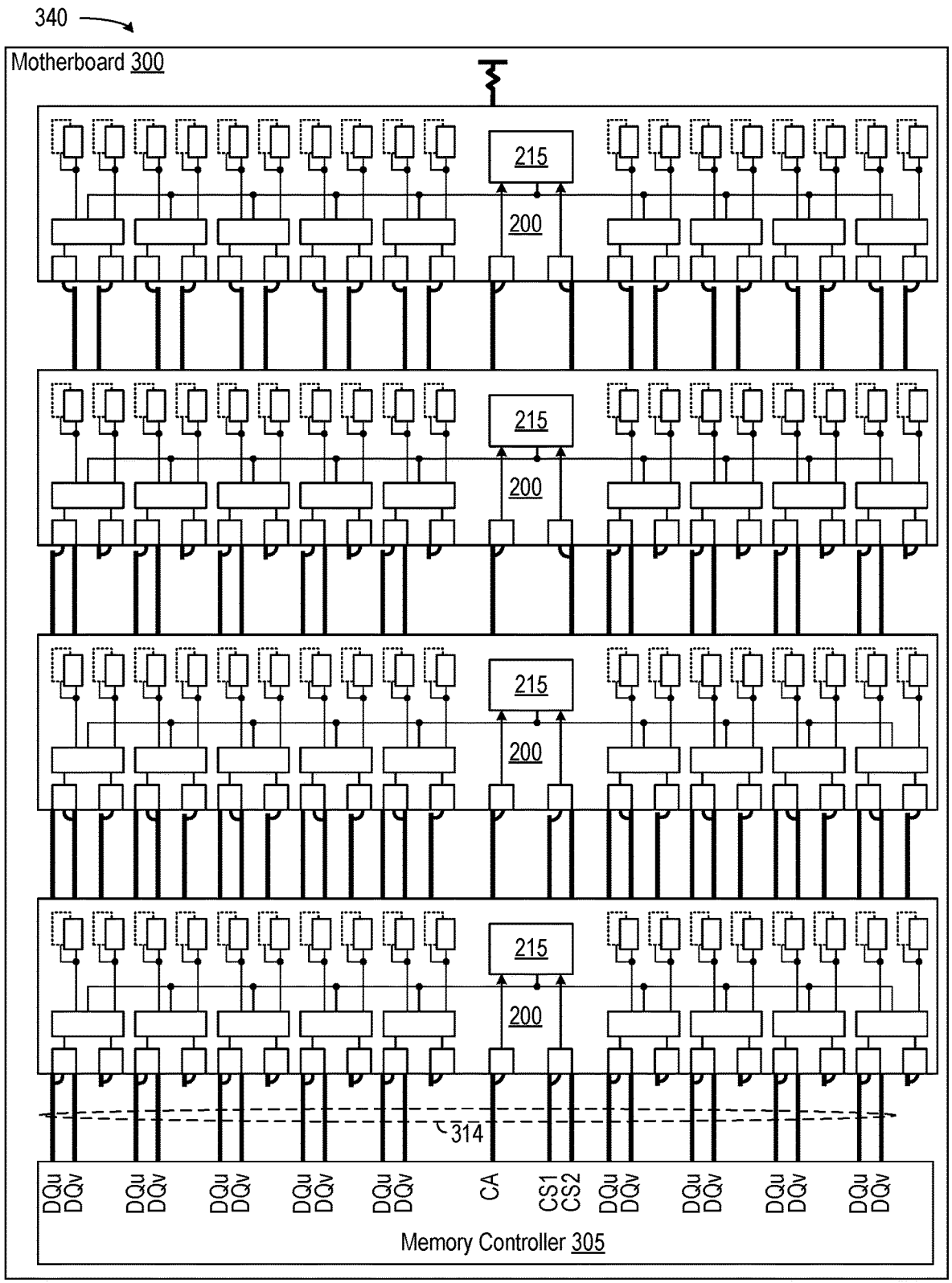
FIG. 3I depicts memory system 340 of FIG. 3F omitting some details in favor of showing all nine data-link groups DQu/DQv that extend from controller 305.

FIG. 3I depicts memory system 340 of FIG. 3F omitting some details in favor of showing all nine data-link groups DQu/DQv that extend from controller 305. This collection of conductors represents the full width of memory channel 314. Motherboard 300 and memory controller 305 may include more channels in support of more memory modules 200.

Figure 4:
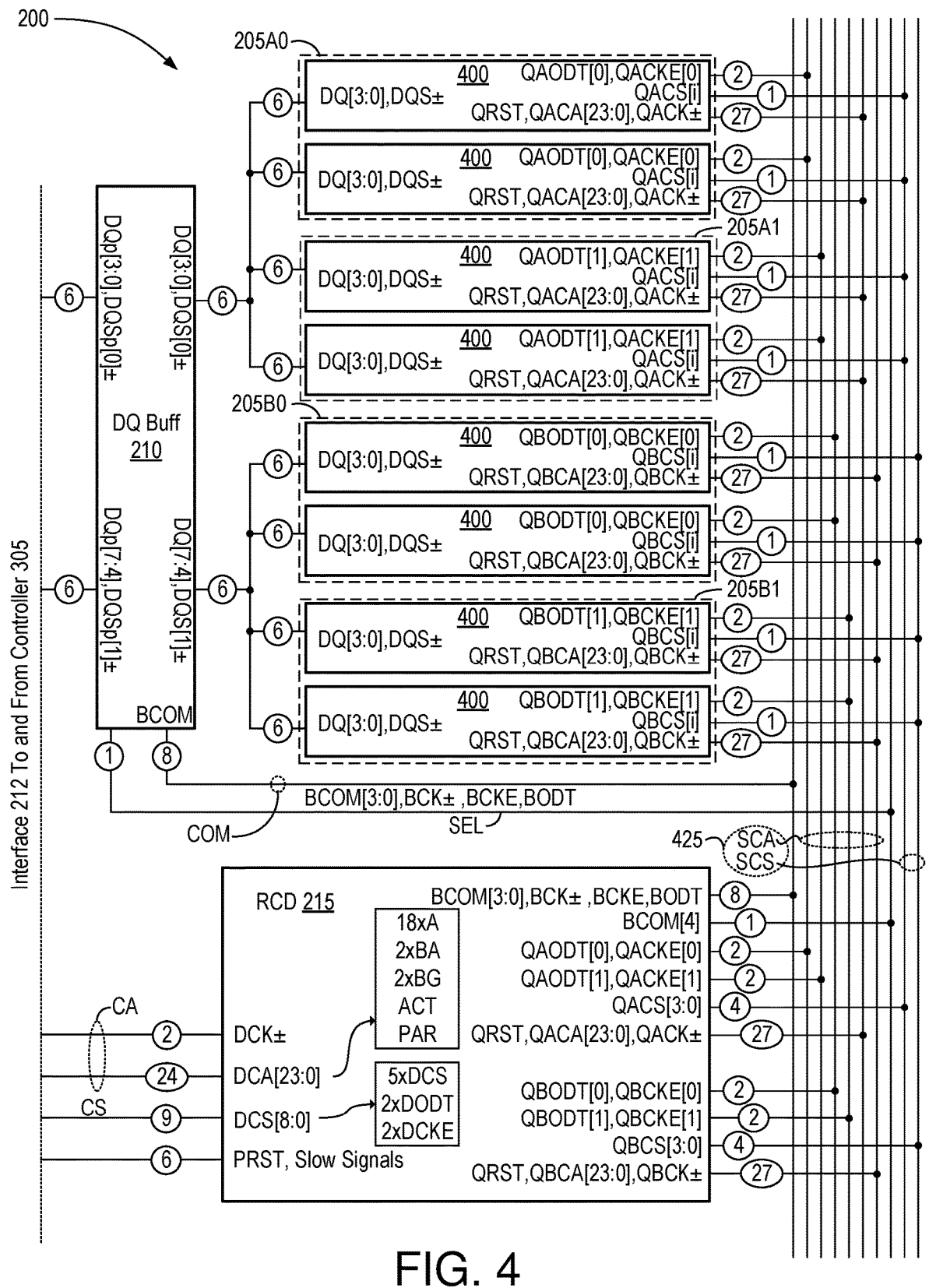
FIG. 4 details a portion of memory module 200, introduced in FIGS. 2A and 2B, highlighting features and connectivity that support width configurability in accordance with one embodiment.

FIG. 4 details a portion of memory module 200, introduced in FIGS. 2A and 2B, highlighting features and connectivity that support width configurability in accordance with one embodiment. Address-buffer component 215 is shown with one of the nine data-buffer components 210 and the four DRAM components 205 with which the buffer directly communicates. Each DRAM component 205 includes a pair of DRAM dies 400, and four components 205 associated with one data-buffer component 210 are distinguished using a two-place alphanumeric designation (A0, A1, B0, and B1). Secondary CA interface SCA, secondary CS interface SCS, and communication interface COM each include multiple conductors with associated signals, to be discussed below. In this example, module 200 comprises a PC board, with components 205A0/B0 on one side and components 205A1/205B1 on the other.

Data-buffer component 210 includes two "nibble" data ports DQp[3:0], DQSp[0]± and DQp[7:4], DQSp[1]± on the controller side (or "processor" side), where "DQSp[#]±" specifies two-line complementary strobes; and includes similar data ports DQ[3:0], DQSp[0]± and DQ[7:4], DQSp[1]± on the DRAM side. Select signal SEL steers data, and commands issued on lines BCOM[3:0] of communication interface COM direct data and configure data-buffer component 210 in support of width configurability. Alternatively, address buffer 215 can issue a select command in lieu of select signal SEL. Signal BCK± is a complementary clock signal, BCKE is a clock-enable signal that allows data-buffer component 210 to e.g. selectively power its interface circuits for improved efficiently, and BODT controls on-die-termination elements in data-buffer component 210 for impedance matching. These signals are generally well documented and understood by those of skill in the art, with a few modifications detailed below.

Each DRAM component 205 communicates with data-buffer component 210 via a data-and-strobe port DQ[3:0], DQS±, and communicates with address-buffer component 215 over a secondary bus 425 via ports QA/BODT[#], QA/BCKE[#], QA/BCS[i]; and QRST,QA/BCA[23:0],QA/BCK±. Components 205 are conventional, and their input control signals and ports are well documented and understood by those of skill in the art. Briefly, signals QA/BODT[#] control the on-die termination values for each DRAM component 205; signals QA/BCKE[#] (the "CKE" for "clock-enable"), are used to switch components 205 between active and low-power states; QA/BCS[i] are chip-select signals that determine which of components 205, if any, is active for a given memory transaction; QRST is a reset signal common to all components 205; QA/BCA[23:0] are command and address ports; and QA/BCK± receive a complementary clock signal that serves as a timing reference.

At the left in address-buffer component 215, the primary links (from controller 305) are labeled "DCK±", "DCS[8:0]" and "DCA[23:0]". In this configuration, chip-select links DCS[3:0] carry the decoded chip-select information for four ranks; link DCS[4] is not used. (In this context, a "rank" is a set of memory dies the controller accesses simultaneously to read and write data.) The "slow signals" that are connected to address-buffer component 215 are used for initialization and maintenance operations.

Address-buffer component 215 copies commands and addresses on links DCA[23:0] to links QACA[23:0] and QBCA[23:0] of secondary address interface SCA. Address-buffer component 215 also copies chip-select information on the primary links DCS[3:0] to only one of link groups QACS[3:0] or QBCS[3:0] of secondary interface SCS. The choice between link groups QACS[3:0] and QBCS[3:0] depends upon the value of signal DCS[4] in one embodiment, but other bits might be used for this sub-selection function. Address bit A[17] and bank-group address bit BG[1] are other possibilities.

Component 205A0 is on the front of module 200 and contains two DRAM dies 400 connected to respective lines QACS[2,0] of secondary CS interface SCS, and component 205A1 is on the back of module 200 and contains two DRAM dies 400 connected to respective lines QACS[3,1]. Component 205B0 is on the front of module 200 and contains two DRAM dies 400 connected to respective lines QBCS[2,0] and component 205B1 is on the back of module 200 and contains two DRAM dies 400 connected to respective lines QBCS[3,1]. DRAM dies and packages can be stacked. Each site can hold e.g. one or two DRAMs. The figure shows a front site and a back site, with two DRAMs per site. Other embodiments support more or fewer dies per site, depending e.g. on the DRAM packaging option.

Component 215 conveys memory component sub-selection information to data-buffer components 210 via select signal SEL, also identified as BCOM[4]. This signal instructs each data-buffer component 210 to access components 205A[1:0] or 205B[1:0] respectively connected to the low (DQ[3:0]) or high (DQ[7:4]) secondary DQ link groups. Signal BCOM[4] can be used for other purposes, in addition to this selection function. For example, they could be used for initialization, maintenance, and testing operations, or can be used to encode the select signal.

Primary links DCS[8:0] pass signals DODT[1:0], which control the output device termination of components attached to a DQ link that are not performing a direct access. For a column write operation, for example, one of signals QACS[3:0] on secondary link SCS is asserted, and the QACA[23:0] secondary CA links carry the column write command and address information. One chip-selected DRAM die 400 will perform the write access in the half-width mode, or two in the full-width mode. The write access enables the ODT termination in the DRAM being accessed. Address-buffer component 215 also provides signals DODT[1:0] of the primary link group DCS[23:0] as secondary signals QAODT[1:0] and QBODT[1:0] to control the terminations of pairs of unselected DRAM dies 400 that share a data-buffer connection with a selected die 400. Read accesses are treated similarly, but address-buffer component 215 directs data from the selected dies 400 to the controller via data-buffer component 210.

For write or read access, the applied termination values will typically be different than the value used by the DRAM performing a write access, because the termination is dampening reflections from the interconnection stub. In the half-width mode, two dies 400 in the unselected component 205 have their terminations enabled. This is not required because no data is to be transferred over the affected link.

Primary chip-select links DCS[8:0] include two links (e.g., DCS[1:0]) that control the power state (clock enable) of 205 that are not performing a direct access. For a column read operation to the lower die 400 of component 205A0, for example, address-buffer component 215 asserts signal QACS[2], and secondary links QACA[23:0] carry the column read command and address information. In the half-width mode, the selected die alone performs the read access. In the full-width mode, the lower die 400 in component 205B0, also connected to link QBCS[2], is likewise selected and participates in the read access.

Address-buffer component 215 includes a number of circuits that are omitted here. Such circuits may include a phase-locked loop, training and built-in self-test (BIST) logic, a command buffer, and a command decoder. These and other circuits are well understood by those of skill in the art, and details unrelated to the present disclosure are omitted for brevity.

Figure 5:
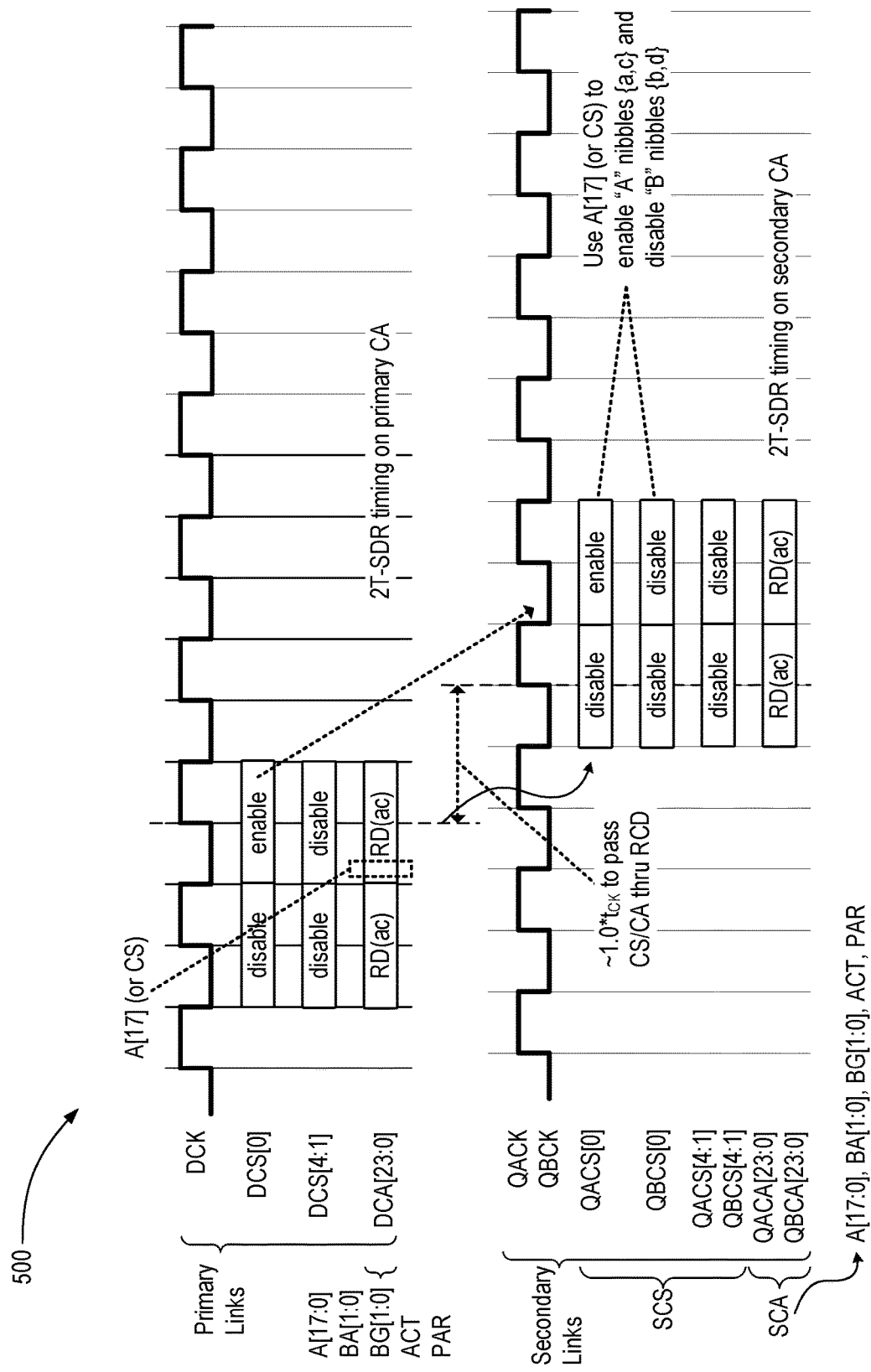
FIG. 5 is a timing diagram 500 illustrating a column read operation for the four-module memory system 340 FIG. 3F, with module details provided in FIG. 4.

FIG. 5 is a timing diagram 500 illustrating a column read operation for the four-module memory system 340 FIG. 3F, with module details provided in FIG. 4. The primary and secondary CA and CS links use 2T-SDR timing in this example, which means that each bit of information occupies a two-clock-cycle interval. Command and address signals are carried on the primary links DCA[23:0] (just "DCA" in FIG. 3F), and command and address information is driven for a two-clock-cycle interval.

In the case of an activation operation, the ACT link of DCA[23:0] is asserted, with a row address carried on the A[17:0] links of link group DCA[23:0]. In the case of a column read or write operation, the ACT link is de-asserted, and the column command and the column address are carried on the A[17:0] links. In either case, the bank-group address is carried on the B G[1:0] links of DCA[23:0], the bank address is carried on the BA[1:0] links, and the PAR link contains error-control information.

Address-buffer component 215 copies the command and address on primary links DCA[23:0] to secondary links QACA[23:0] and QBCA[23:0], which are part of secondary command interface SCA illustrated in e.g. FIG. 3F. The secondary command and address information is also driven for a two-clock-cycle interval. When module 200 operates in the half-width mode, one of the secondary CA link groups can be left un-asserted to reduce power.

In the example in FIG. 5 primary CS link DCS[0] link is asserted and links DCS[4:1] are not. The asserted link is enabled only in the second cycle of the two clock cycle interval it occupies. Primary CS link DCS[4], used here for component sub-selection, is asserted. Component 215 thus copies the chip select information from primary links DCS [4:0] links to secondary links QACS[4:0], leaving secondary links QBCS[4:0] un-asserted. Had link DCS[4] not been asserted, component 215 would have copied the chip-select information from primary links DCS[4:0] links to secondary links QBCS[4:0] and left secondary links QACS[4:0] un-asserted.

When two half-width modules are accessed concurrently, both modules receive the same CS link group and the same DCS[0] link is asserted. Both modules therefore perform the same column operation. However, the selected number of DRAM components 205 on each module 200 is halved. The assertion of primary DCS[0] link causes signal QACS[0] to be asserted; the secondary CS signal QBCS[0] is not asserted. These signals can be controlled by an unused link in the CA link group or CS link group. In this example, link DCS[4] is used.

Figure 6:
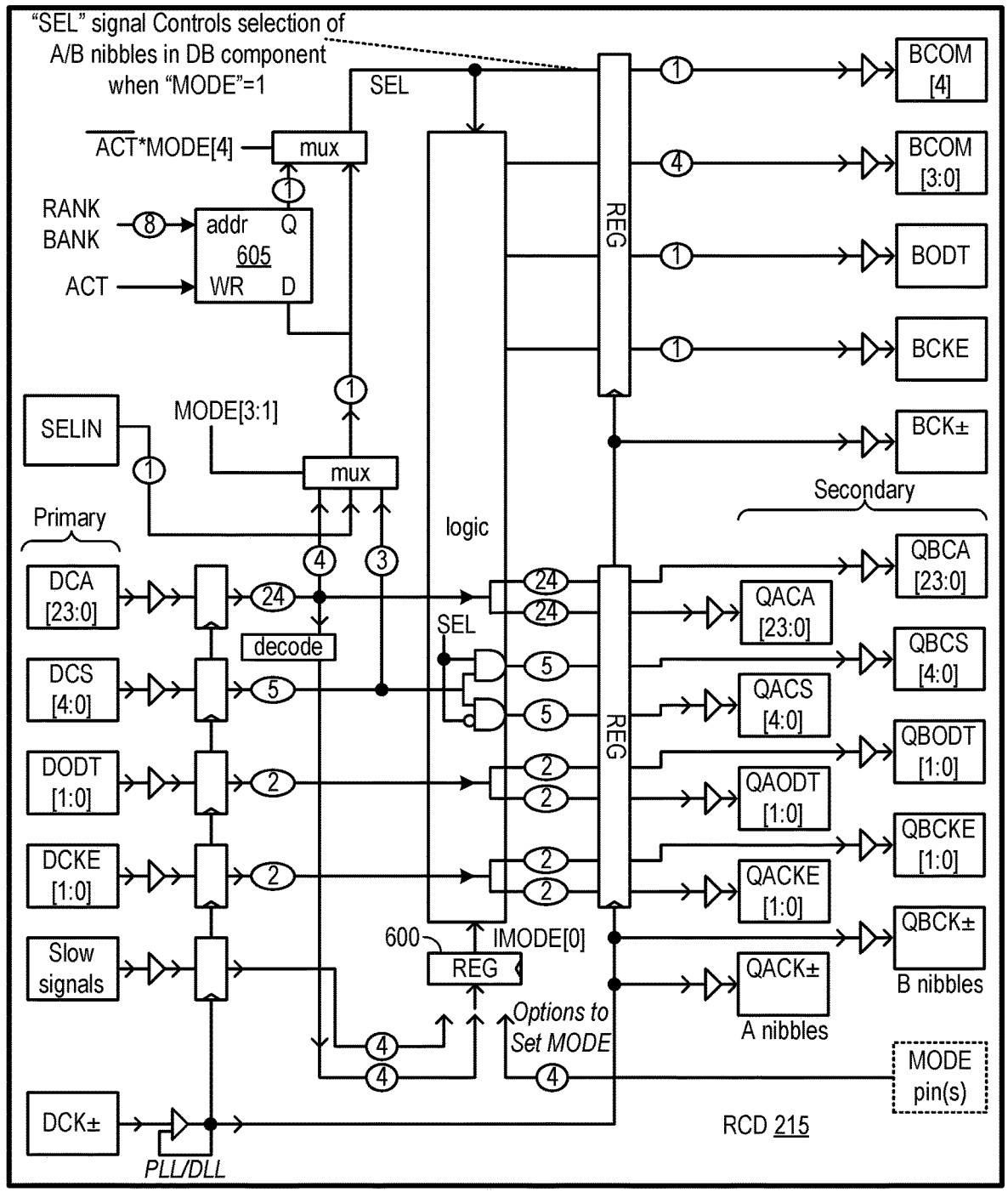
FIG. 6 details an embodiment of address-buffer component 215 of FIG. 2.

FIG. 6 details an embodiment of address-buffer component 215 of FIG. 2. The primary links and their corresponding signals are designated DCK±, DCS[4:0], DCA[23:0], DODT[1:0], and DCKE[1:0]. The "slow signals" that are connected to the RCD are used for initialization and maintenance operations. An internal mode signal IMODE[0] chooses between wide and narrow modes, as noted previously. In the wide mode, address-buffer component 215 copies command and address bits on primary links DCA [23:0] to secondary links QACA[23:0] and QBCA[23:0], and copies chip-select information on primary links DCS[4:0] to secondary links QACS[4:0] and QBCS[4:0]. In the narrow mode, select signal SEL controls which of secondary links QACS[4:0] and QBCS[4:0] are asserted.

Address-buffer component 215 copies termination information on primary links DODT[1:0] to secondary links QAODT[1:0] and QBODT[1:0]. Component 215 also copies the clock-enable information on primary links DCKE[1:0] to secondary links QACKE[1:0] and QBCKE[1:0].

Component 215 decodes or transfers select signal SEL from the primary CS signals DCS[4:0]. As noted previously, signal DCS[4] can be used. Alternatively, a dedicated pin SELIN can be added to drive select signal SEL. Signal SEL can also be driven from a number of DCA or DCS links that are not otherwise needed by memory module 200 to access the DRAM components. For example, signal SEL can be driven from a signal of the primary command and address link group DCA[23:0]. Address link A[17] is one possibility. Other links could be chosen using a static configuration value from a control register 600. For example, bank-group signal BG[1] could be used for SEL in embodiments with eight banks of DRAM dies. Select signal SEL can also be driven from a signal from the CS link group. FIG. 6 shows how other DCS links could be chosen using a static configuration value from register 600. Another alternative is the use of one of the above sources for the SEL value during an activation operation (ACT=1). This value can be written into a small memory array 605 using e.g. the Rank address (DCS[4:0]) and Bank address (BG[1:0]/BA[1;0]) as an index. This value is then read when a column read or write (ACT≈0) is performed to the activated bank. This means that the controller does not need to keep track of the SEL value after the row has been activated.

Address bit A[13] could be used during column read or write operations, essentially doubling the size of an activated row; the activated row stretches across two different DRAM components in the module. This avoids the need of specifying SEL during an activation operation, at the cost of an increase in power.

Control register 600 is set statically at system initialization time. There are several possible options for setting this configuration value. These include: [1] a mode pin(s) on the module interface, [2] decoding a value received on the primary link groups DCA and DCS, the data link groups DQu/DQv, or [3] using a slow signal link (e.g. an SPD bus, an I2C bus, or something similar) to set a control register.

Figure 7:
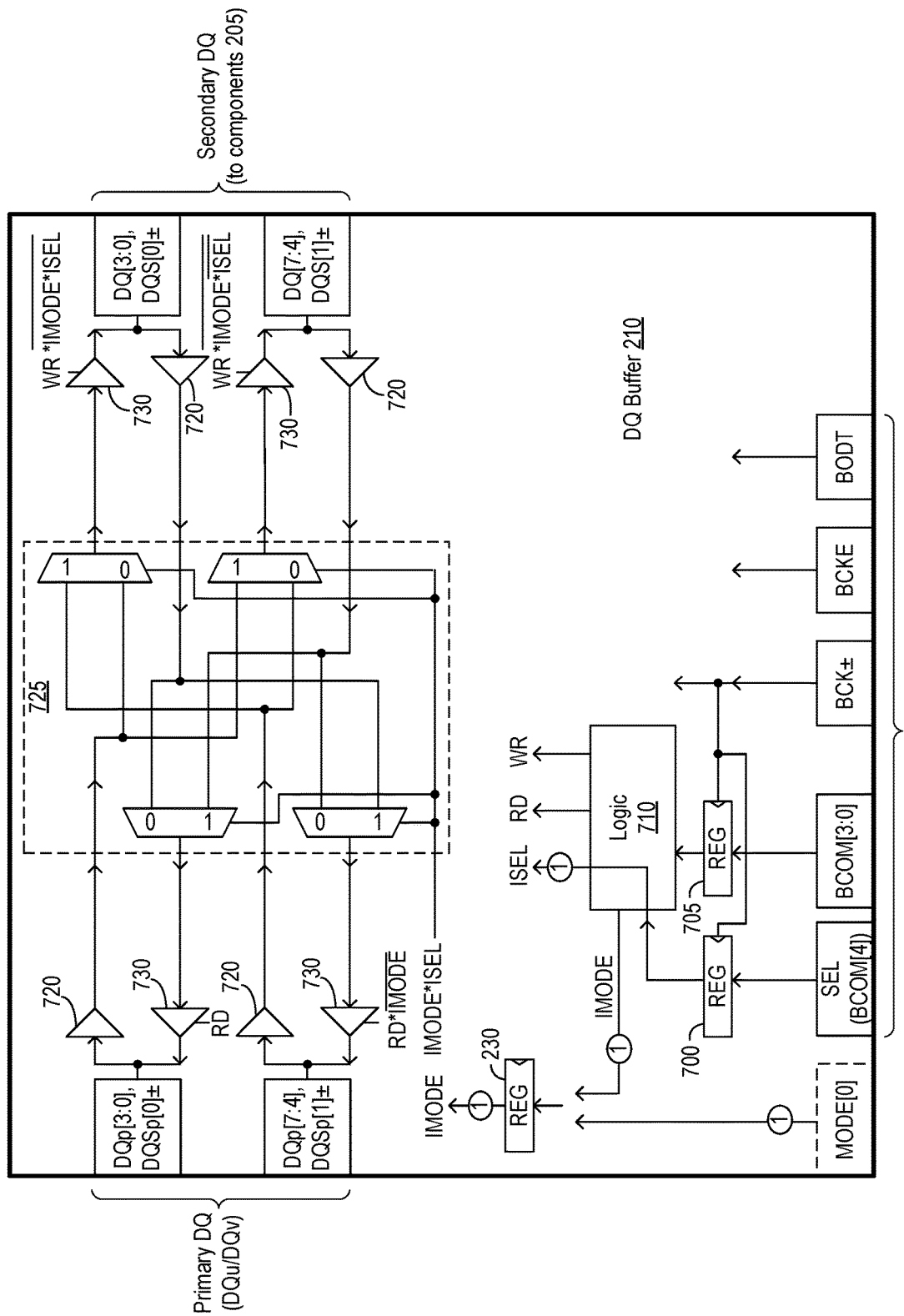
FIG. 7 depicts data-buffer component 210 in accordance with one embodiment.

FIG. 7 depicts data-buffer component 210 in accordance with one embodiment. The primary DQ interface, which connects to e.g. controller 305 via link groups DQu and DQv, includes two six-point connections: low-order data and strobe connections DQp[3:0] and DQSp[0]±, and high-order data and strobe connections DQp[7:4] and DQSp[1]±. The secondary DQ interface, which connects to components 205, likewise includes two six-point connections: low-order data and strobe connections DQ[3:0] and DQS[0]±, and high-order data and strobe connections DQ[7:4] and DQS [1]±. The local interface to address-buffer component 215 receives communication signals BCOM[4:0], complementary clock signal BCK±, clock enable BCKE, and on-die termination (ODT) control signal BODT. A pair of registers 700 and 705 capture communication signals BCOM[4:0] and present them to logic 710, which derives therefrom an internal mode signal IMODE, an internal select signal ISEL, and read and write signals RD and WR. Mode signal IMODE is stored in mode register 230, which was introduced in connection with FIG. 2. In another embodiment signal IMODE is not decoded from communication signals BCOM[4:0] but is provided from component 215 or elsewhere via a separate connection.

Receivers 720 on the primary and secondary sides of data-buffer component 210 buffer and convey incoming data signals to steering logic steering logic 725. Logic 725 steers the received signals to selected transmitters 730 as directed by internal mode signal IMODE and internal select signal ISEL. Those signals, plus a read signal RD and write signal WR, selectively enable ones of transmitters 730.

Logic 710 loads register 230 with either a one or a zero at the direction of address-buffer component 215. Setting signal IMODE to zero selects the wide mode and to one the narrow mode. In the wide mode, data-buffer component 210 transfers read and write data between the low-order data and strobe connections on the primary and secondary link groups (DQp[3:0]/DQSp[0]± to and from DQ[3:0]/DQS[0]±), and transfers data between the high-order data and strobe connections on the primary and secondary link groups (DQp[7:4]/DQSp[1]± to and from DQ[7:4]/DQS[1]±). These transfers occur in parallel.

In the narrow mode, data-buffer component 210 transfers read and write data between the low-order data and strobe connections on the primary and secondary link groups (DQp[3:0]/DQSp[0]± to and from DQ[3:0]/DQS[0]±), or transfers read and write data between the low-order data and strobe connections on the primary link groups and the corresponding high-order connections on the secondary link groups (DQp[3:0]/DQSp[0]± to and from DQ[7:4]/DQS[1]±). Internal select signal ISEL selects between these two transfer cases based on select signal SEL on line BCOM[4] from address-buffer component 215.

Clock signal BCK±, enable signal BCKE, and termination-control signal BODT are well understood, and their operations are not altered between modes. The value of mode signal IMODE can be established in various ways, including via [1] an external pin, [2] decoding a value received on the BCOM[3:0] links, [3] a control register write during initialization, and [4] reading a value from a serial-presence detect (SPD) component and set the register bit. Other methods are possible.

Figure 8:
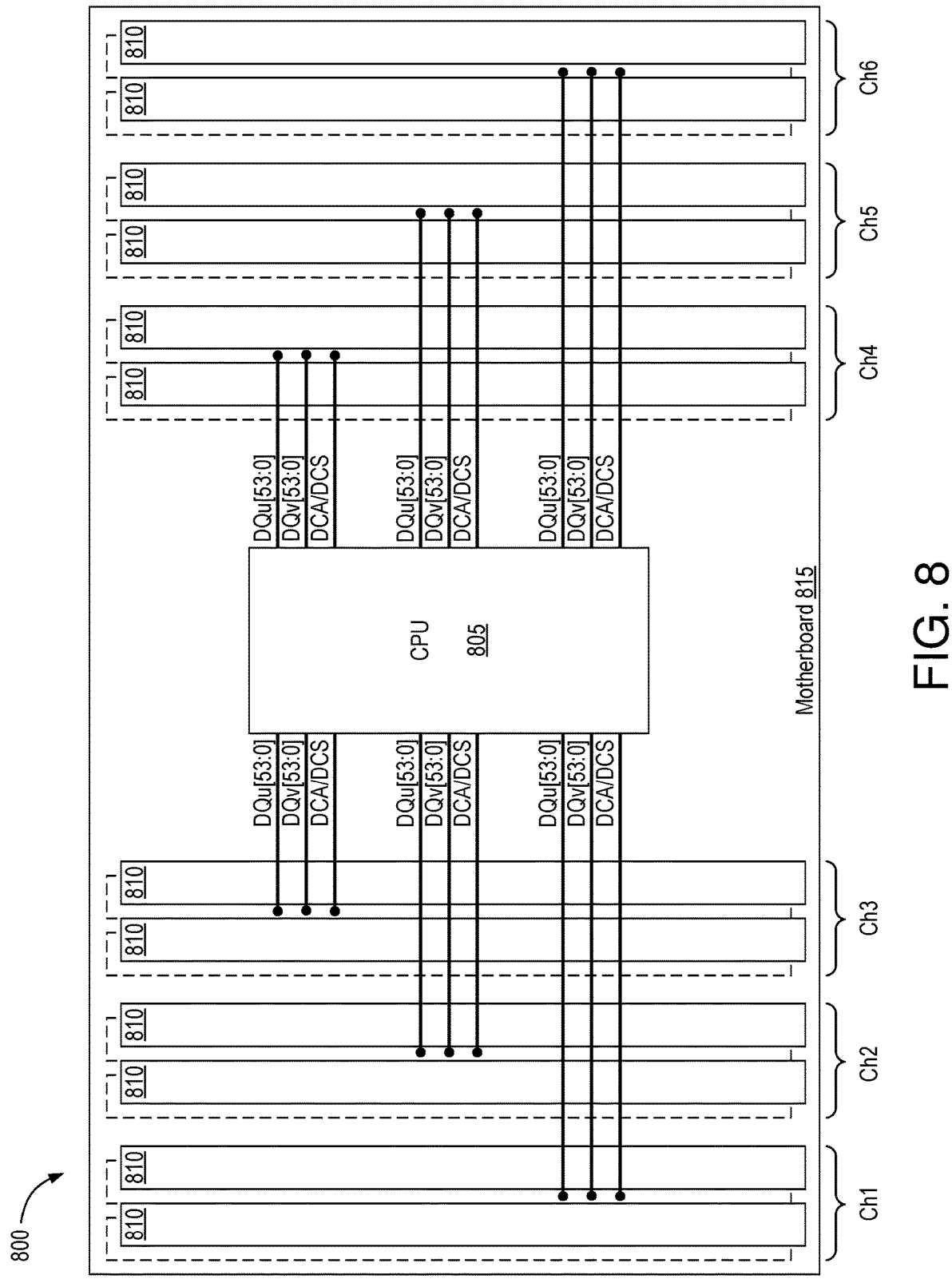
FIG. 8 depicts a memory system 800 in accordance with one embodiment.

FIG. 8 depicts a memory system 800 in accordance with one embodiment. System 800 includes a central processing unit (CPU) 805 and twenty-four memory modules 810 affixed to a motherboard 815. Modules 800 can be similar to those detailed above in connection with FIG. 2. Memory modules 810 are collected into groups of four, each connected one of six memory channels Ch[6:1]. Each channel supports nine DQu nibbles and nine DQv nibbles, each nibble including four data bits and complementary strobes. Additionally, CPU 805 can be interchanged with an ASIC, FPGA, GPU, ARM processor or any other IC that supports memory transactions with modules 810. Motherboard 815 may include any number of passive components, voltage regulators, connectors, etc., that are omitted here for simplicity.

High-capacity, planar memory systems of this type can suffer signal degradation due to the physical, horizontal trace lengths used to communicate between the memory controller and memory modules. This signal degradation can be due to via-trace and trace-to-trace noise coupling, and insertion losses from metallic and dielectric absorptions. Memory system 800 reduces the trace lengths and associated signal degradation by allowing memory modules to be inserted on the top and bottom sides of motherboard 815.

FIGS. 9A-9D depict nibble-wide DQ routing options for an individual memory channel of memory system 800 of FIG. 8 populated with different numbers of modules. Continuity modules can be inserted in unused sockets to bridge the nibble-based link groups where the terminating memory modules alleviate strong signal reflections. Modules 810 are simplified to show one of nine data-buffer components 910 and associated DRAM components 205. Data-buffer components 910 are similar to data-buffer components 210 of FIGS. 2A and 2B, but are modified to support two half-width configurations, one for each of the two nibble-wide primary data interfaces. Motherboard 815 is shown from the side to separately illustrate DQ link-group routing on both sides.

Figure 9A:
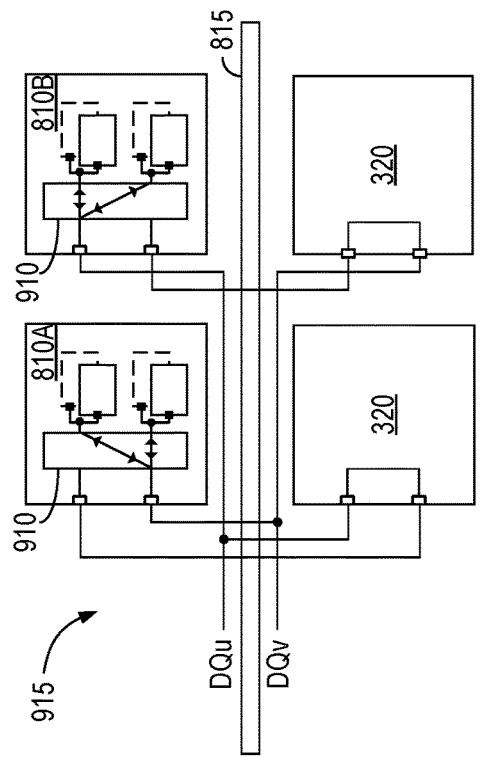
FIGS. 9A-9D depict nibble-wide DQ routing options for an individual memory channel of memory system 800 of FIG. 8 populated with different numbers of modules.

FIG. 9A illustrates a memory system 900 that includes motherboard 815 of FIG. 8 with a single module 810, two empty sockets 310, and a connectivity module 320. Data-buffer component 910 is configured in the full-width mode and operates much as does the example of FIG. 3B. DQ link groups DQu and DQv each terminate at two module sockets 310.

Figure 9B:
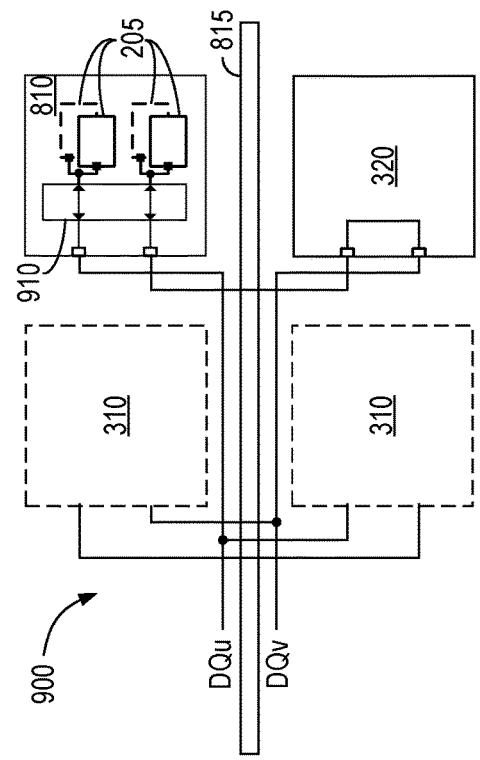

FIG. 9B illustrates a memory system 915 in which motherboard 815 supports two modules 810A and 810B, each module with a data-buffer component 910 configured in a different half-width mode. Module 810A is configured to communicate over the high-order data and strobe connections, whereas module 810B is configured to communicate over the low-order connections. Data-buffer components 910 can be similar to data-buffer components 210 but modified to support the high-order half-width mode. Address-buffer component might also be modified to convey configuration signals for establishing the mode or modes. This option to select either the high-order or low-order half-width mode for each module allows for board-level routing flexibility.

The far unused module sockets can be populated with continuity modules 320 or otherwise terminated to reduce reflections. For example, a termination module can provide a termination impedance for each DQ and DQS signal line to absorb the signals that reach the unused socket. Termination impedances can be coupled to the same supply voltage as the installed modules to mimic the memory-module terminations.

Figure 9C:
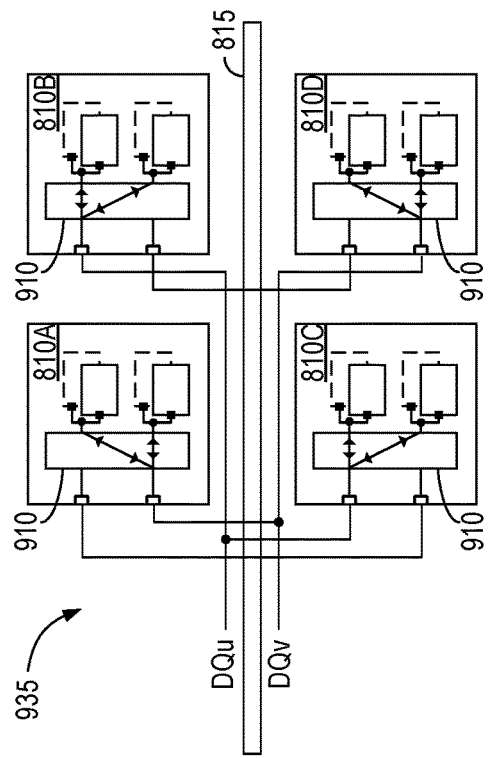

FIG. 9C illustrates a memory system 930 in which motherboard 815 supports two modules 810, each module with a data-buffer component 910 configured in the full-width mode. Alternatively, modules 810 could be conventional fixed-width modules. The unused module sockets are populated with continuity modules 320.

Figure 9D:
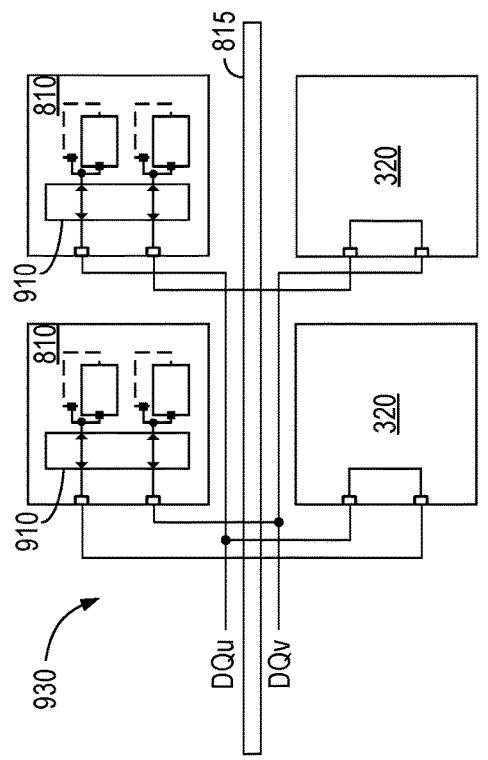

FIG. 9D illustrates a memory system 935 in which motherboard 815 supports four modules 810A, 810B, 810C, and 810D, each module with a data-buffer component 910 configured in a half-width mode. Modules 810A and 810D are configured to communicate over the high-order data and strobe connections, whereas modules 810B and 810C are configured to communicate over the low-order connections. Each data link group connects a controller (not shown) to two modules. One skilled in the art will find that the partially terminated stubs seen on link groups DQu and DQv are now approximately a quarter to a tenth the lengths seen by the inner memory module relative to those of FIG. 3F. As a result, the ODT setting of the idle memory module can be set to open instead of absorbing, which leads to lower power consumption. Additionally, the reduction in the stub lengths leads to improved signal integrity and higher data transfers on the buses.

Figure 9E:
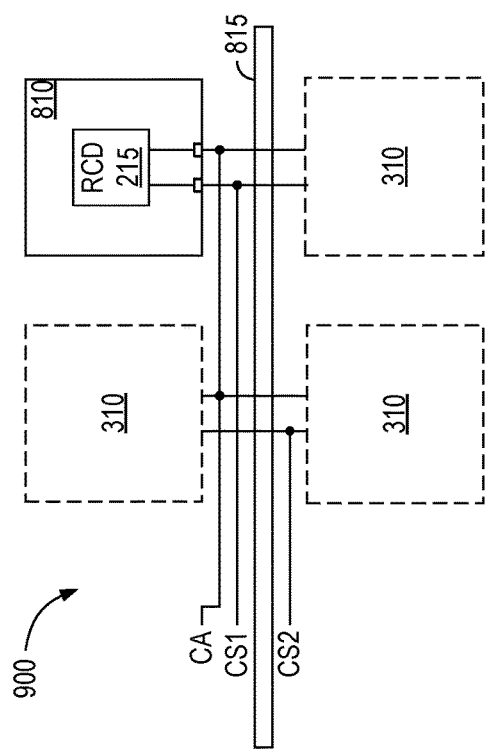
FIG. 9E illustrates memory system 900 of FIGS. 9A-9D, in this instance showing the CA (command/address) routing topology.

FIG. 9E illustrates memory system 900 of FIGS. 9A-9D, in this instance showing the CA (command/address) routing topology. The depiction of memory module 810 omits the DQ buffer and DRAM components in favor of address-buffer component 215. CA link groups extend to sockets 310 in a "two-tee daisy chain," which alleviates a dip in insertion loss common to four-drop daisy chain topologies. Termination modules (not shown) can be included, and address-buffer components 215 can include equalization circuitry in support of higher signaling rates.

Figure 10A:
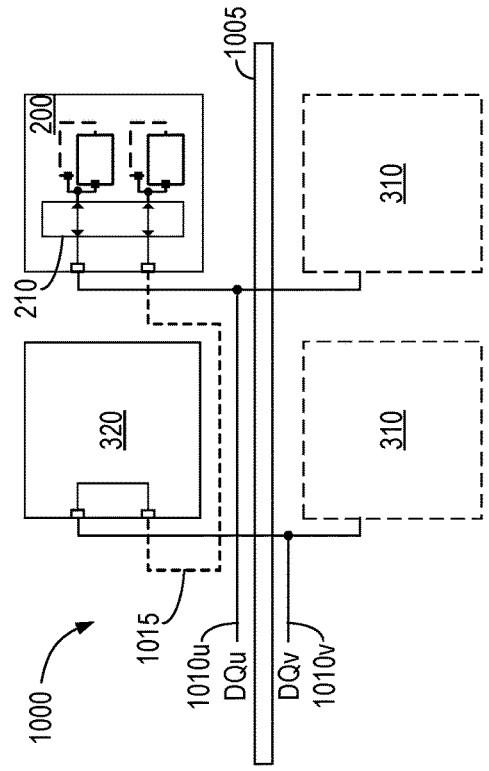
FIGS. 10A-10C depict nibble-wide DQ routing options for an individual memory channel of a motherboard 1005 in accordance with another embodiment.
Figure 10C:
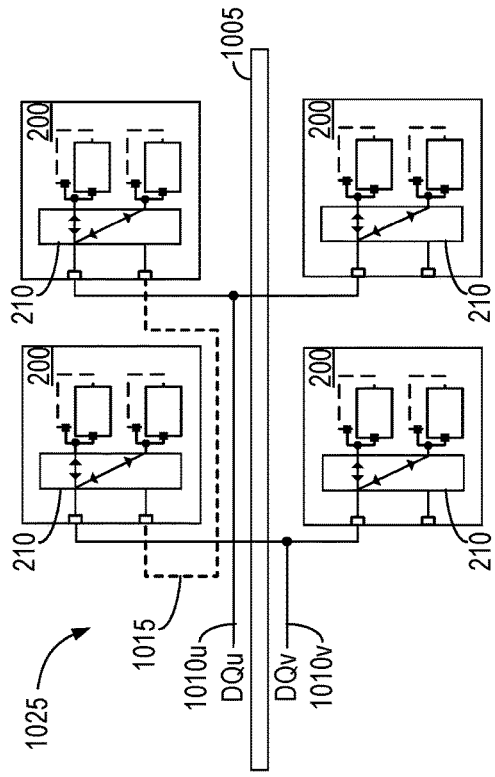
Figure 10B:
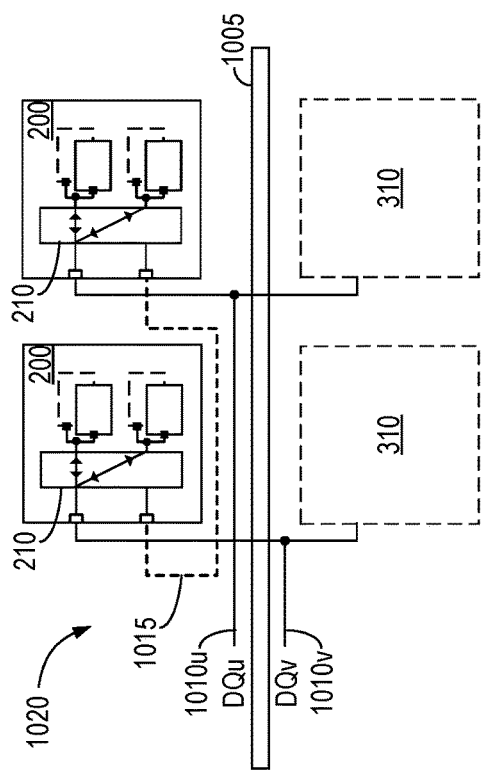

FIGS. 10A-10C depict nibble-wide DQ routing options for an individual memory channel of a motherboard 1005 in accordance with another embodiment. Considering FIG. 10A first, DQ signals DQu and DQv are conveyed via T-shaped link groups 1010u and 1010v, respectively. A third link group 1015 interconnects two of four module sockets 310 and does not connect to the memory controller. In this single-module configuration, motherboard 1005 is provided with a single module 200, two empty sockets 310, and a continuity module 320. Data-buffer component 210 is configured in the full-width mode and operates much as does the example of FIG. 3B. The low-order DQ connections of module 200 are coupled to link group 1010u, and the high-order DQ connections are coupled to link group 1010v via link group 1015 and continuity module 320. Alternatively, the high-order DQ connections of module 200 could be coupled to link group 1010*u* and the low-order DQ connections to link group 1010*v*.

FIG. 10B illustrates a memory system 1020 in which motherboard 1005 supports two modules 200 each configured in the half-width mode. The unused module sockets can be populated with termination modules. Link group 1015 is not used.

FIG. 10C illustrates a memory system 1025 in which motherboard 1005 supports four modules 200 each configured in the half-width mode. Link group 1015 is not used.

FIGS. 11A-11D depict byte-wide DQ routing options for an individual memory channel of a motherboard 1105 in accordance with another embodiment. Considering FIG. 11A first, a memory system 1100 includes a motherboard 1105 on which DQ signals DQu and DQv are conveyed via T-shaped link groups 1110*u* and 1110*v*, respectively. A third link group 1115 interconnects four module sockets 310 and does not connect to the memory controller. In this single-module configuration, motherboard 1105 is provided with a single module 1120, two empty sockets 310, and a continuity module 320. A DQ component 1125 is configured in a full-width mode and operates much as does the example of FIG. 3B. The low-order DQ connections of module 1120 are coupled to link group 1110*u*, and the high-order DQ connections are coupled to link group 1110*v* via link group 1115 and continuity module 320. As explained below, DQ components 1125 support a data-forwarding mode that that allows modules 1120 to act as continuity modules in multi-module systems.

Figure 11B:
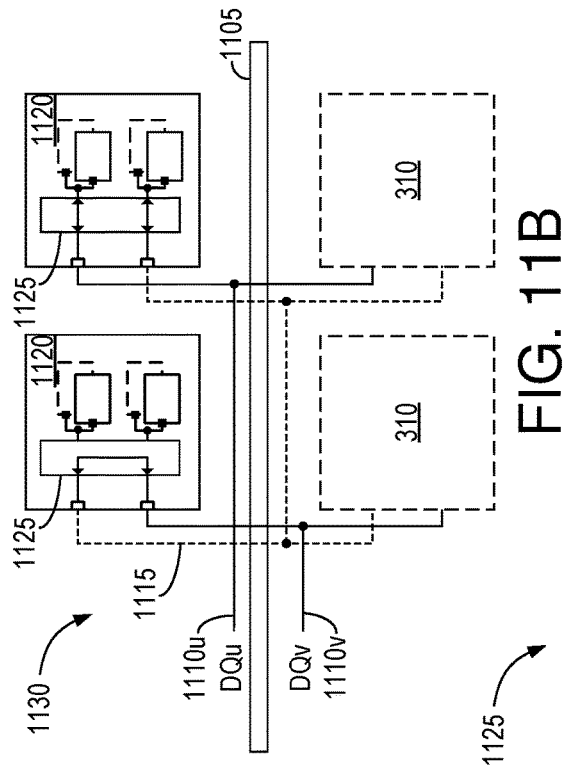
FIGS. 11A-11D depict byte-wide DQ routing options for an individual memory channel of a motherboard 1105 in accordance with another embodiment.

FIG. 11B illustrates a memory system 1130 in which motherboard 1105 supports two modules 1120 that each communicates full-width data. Address buffers (not shown) selectively control DQ buffers 1125 and associated memory components in the manner detailed previously. Instead of or in addition to providing different data widths, however, DQ buffers 1125 support a continuity mode in which the corresponding module acts as a continuity module for another module undergoing a memory access. In this example, the low-order DQ connections of the rightmost module 1120 are coupled to link group 1110*u*, and the high-order DQ connections are coupled to link group 1110*v* via link group 1115 and the DQ buffer 1125 of the other memory module 1120. DQ buffers 1125 induce a signaling delay on one DQ nibble in the forwarding mode, and the DQ buffer in the accessed module 1120 can impose the same delay on the other nibble to align the nibbles in time.

Figure 11D:
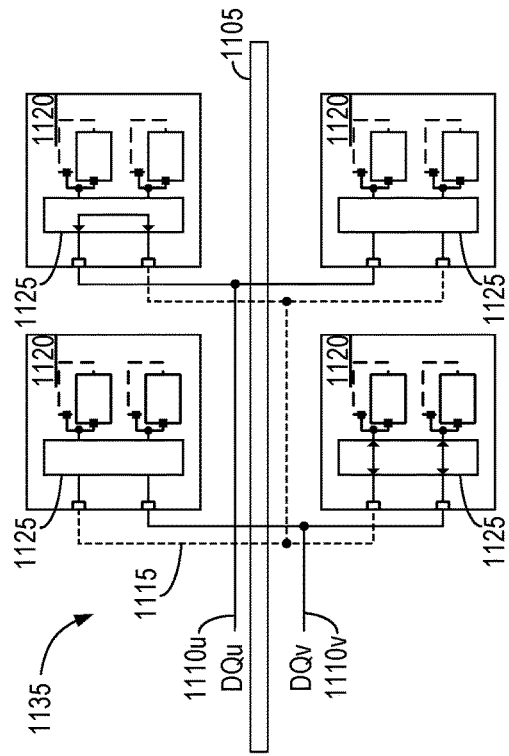
Figure 11A:
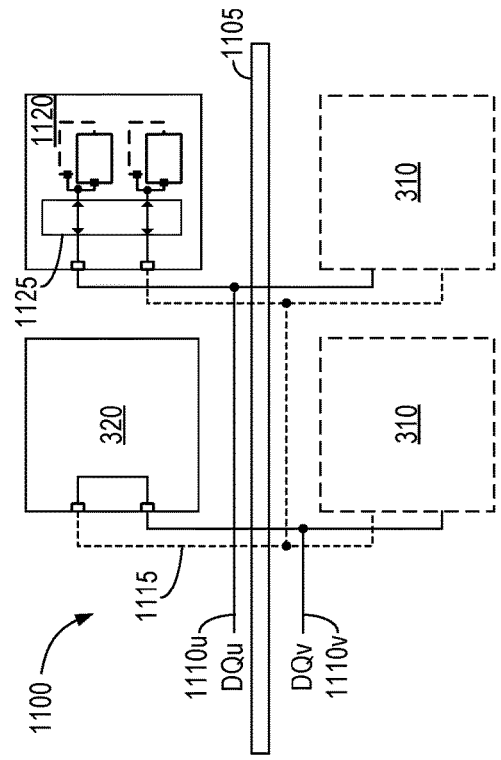
Figure 11C:
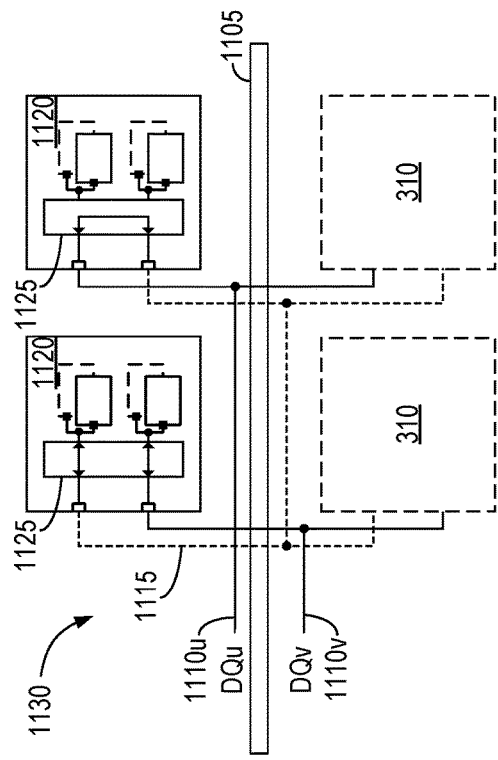

FIG. 11C depicts system 1130 of FIG. 11B with the leftmost module 1120 undergoing a memory access. In this instance the rightmost module 1120 forwards the nibble from link group 1115 to the controller via link group 1110*u*. System 1130 otherwise functions as noted above in connection with FIG. 11B.

FIG. 11D depicts a memory system 1135 in which motherboard 1105 supports four modules 1120 that each communicates full-width data. This example illustrates an access to the lower left module 1120, which is configured to communicate full-width data. Data DQv is routed directly to the high-order bits of DQ buffer 1125 via link group 111*v*, which data DQu is routed to the low-order bits via link group 1110*u*, the upper right module 1120, and link group 1115. The DQ buffers 1125 in the remaining two modules 1120 disconnect the DQ link groups from the respective DRAM components. Each module 1120 can thus provide full-width data using another of the modules for continuity to one of the DQ nibbles.

Figure 12:
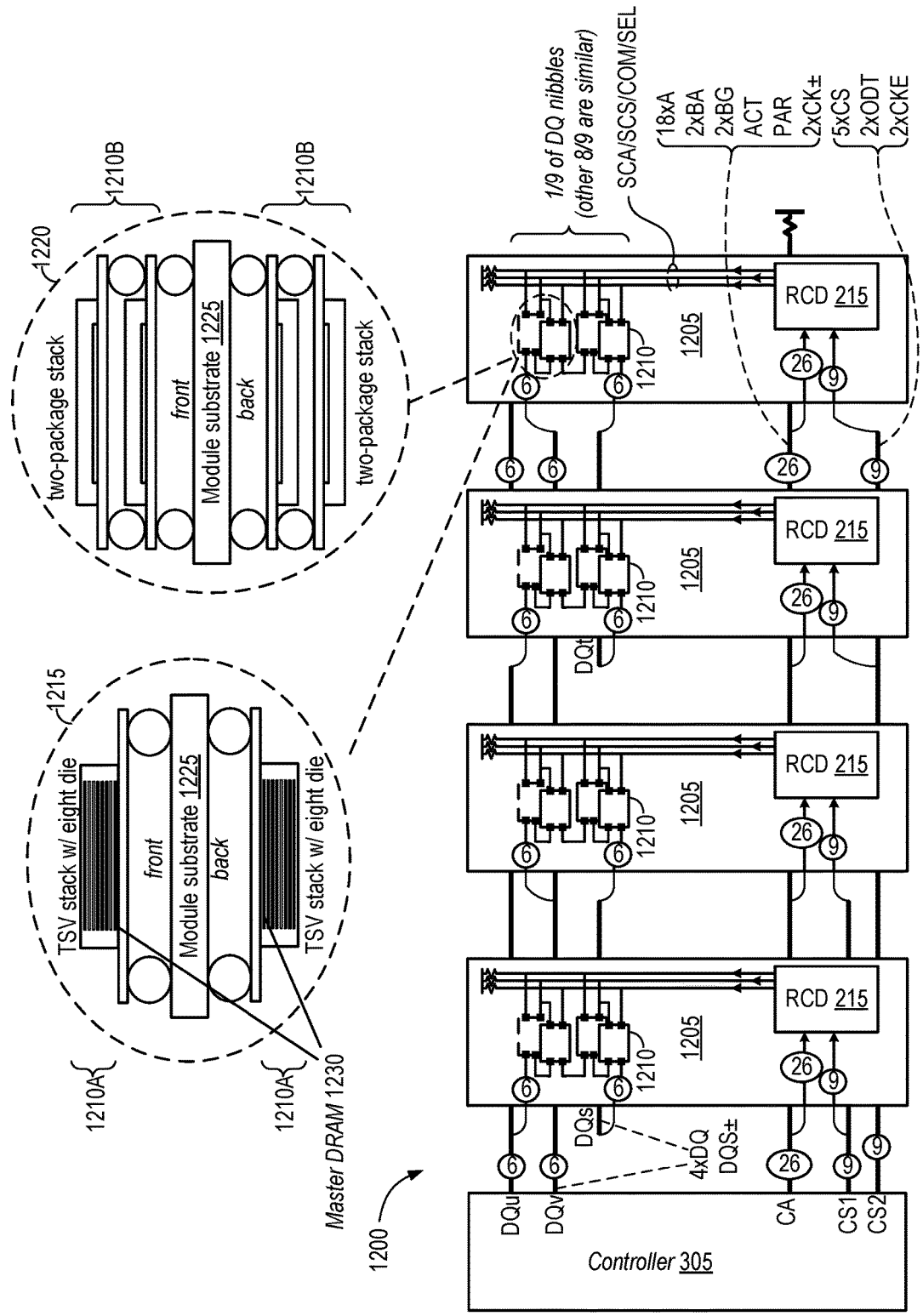

FIG. 12 depicts a memory system 1200 similar to system 340 of FIG. 3F, which like-identified elements being the same or similar. System 1200 includes four installed memory modules 1205, each of which is configured at initialization to the half-width mode. The two leftmost modules 1200 are paired together to collectively communicate byte-wide data, as are the two rightmost modules. As in earlier examples, only $\frac{1}{8}^{th}$ of the data resources is shown for ease of illustration.

System 1200 differs from that of FIG. 3F in that modules 1205 omit data-buffer components 210. Rather, the functionality of those resources is incorporated into DRAM components 1210. With reference to the rightmost module 1205, four DRAM components 1210 collectively serve link group DQv in this half-width mode and can serve two such link groups in the full-width mode. For example, one module 1205 in the full-width mode could be used in lieu of the one module 200 in the example of FIG. 3B.

The four components 1210 are mounted on both sides of module 1205 in this embodiment, with exemplary arrangements 1215 and 1220 shown in cross-section at the top of FIG. 12. Arrangement 1215 includes two stacks of eight DRAM dies interconnected by e.g. through-silicon vias. Stacks 1210A are on either side of module substrate 1225, and each includes a master die 1230 with the requisite data-buffer logic. In the other illustrated alternative arrangement 1220 DRAM components 1210B are two-package stacks, one on either side of module substrate. Other alternative arrangements, with the same or different numbers of dies or packages, can be used in other embodiments.

In the foregoing description and in the accompanying drawings, specific terminology and drawing symbols have been set forth to provide a thorough understanding of the present invention. In some instances, the terminology and symbols may imply specific details that are not required to practice the invention.

For example, any of the specific numbers of bits, signal path widths, signaling or operating frequencies, circuits or devices and the like may be different from those described above in alternative embodiments.

Also, the interconnection between circuit elements or circuit blocks shown or described as multi-conductor signal links may alternatively be single-conductor signal links, and single conductor signal links may alternatively be multi-conductor signal links.

Signals and signaling paths shown or described as being single-ended may also be differential, and vice-versa. Similarly, signals described or depicted as having active-high or active-low logic levels may have opposite logic levels in alternative embodiments.

Circuitry within integrated circuit devices may be implemented using metal oxide semiconductor (MOS) technology, bipolar technology or any other technology in which logical and analog circuits may be implemented.

With respect to terminology, a signal is said to be "asserted" when the signal is driven to a low or high logic state (or charged to a high logic state or discharged to a low logic state) to indicate a particular condition.

Conversely, a signal is said to be "de-asserted" to indicate that the signal is driven (or charged or discharged) to a state other than the asserted state (including a high or low logic state, or the floating state that may occur when the signal driving circuit is transitioned to a high impedance condition, such as an open drain or open collector condition).

A signal driving circuit is said to "output" a signal to a signal receiving circuit when the signal driving circuit asserts (or de-asserts, if explicitly stated or indicated by context) the signal on a signal line coupled between the signal driving and signal receiving circuits.

A signal line is said to be "activated" when a signal is asserted on the signal line, and "deactivated" when the signal is de-asserted.

Additionally, the prefix symbol "/" attached to signal names indicates that the signal is an active low signal (i.e., the asserted state is a logic low state).

A line over a signal name may also be used to indicate an active low signal. The term "coupled" is used herein to express a direct connection as well as a connection through one or more intervening circuits or structures.

Integrated circuit device "programming" may include, for example and without limitation, loading a control value into a register or other storage circuit within the device in response to a host instruction and thus controlling an operational aspect of the device, establishing a device configuration or controlling an operational aspect of the device through a one-time programming operation (e.g., blowing fuses within a configuration circuit during device production), and/or connecting one or more selected pins or other contact structures of the device to reference voltage lines (also referred to as strapping) to establish a particular device configuration or operation aspect of the device. The term "exemplary" is used to express an example, not a preference or requirement.

While the invention has been described with reference to specific embodiments thereof, it will be evident that various modifications and changes may be made thereto without departing from the broader spirit and scope of the invention. For example, features or aspects of any of the embodiments may be applied, at least where practicable, in combination with any other of the embodiments or in place of counterpart features or aspects thereof. Accordingly, the specification and drawings are to be regarded in an illustrative rather than a restrictive sense.

What is claimed is:

1. A motherboard comprising:
   a memory-controller component;
   a first memory-module socket adjacent the memory-controller component;
   a second memory-module socket adjacent the first memory-module socket on a side of the first memory-module socket opposite the memory-controller component;
   a third memory-module socket adjacent the second memory-module socket on a side of the second memory-module socket opposite the first memory-module socket;
   a fourth memory-module socket adjacent the third memory-module socket on a side of the third memory-module socket opposite the second memory-module socket;
   a first data-link group coupling the memory-controller component to the first memory module socket and the third memory-module socket, the first data-link group extending past the second memory-module socket;
   a second data-link group extending past the first memory-module socket and the third memory-module socket, the second data-link group coupling the memory-controller component to the second memory module socket and the fourth memory-module socket;
   a third data-link group extending between the first memory-module socket and the second memory-module socket; and
   a fourth data-link group extending between the third memory-module socket and the fourth memory-module socket.

2. The motherboard of claim 1, further comprising:
   a memory module in one of the first memory-module socket and the second memory-module socket; and
   a continuity module in the other of the first memory-module socket and the second memory-module socket;
   the memory module coupled to the memory-controller component via a data path that includes the third data-link group connected in series with the continuity module.

3. The motherboard of claim 2, wherein the data path includes the first data-link group connected in series with the third data-link group.

4. The motherboard of claim 1, further comprising:
   a memory module in one of the third memory-module socket and the fourth memory-module socket; and
   a continuity module in the other of the third memory-module socket and the fourth memory-module socket;
   the memory module coupled to the memory-controller component via a data path that includes the fourth data-link group connected in series with the continuity module.

5. The motherboard of claim 4, wherein the data path includes the second data-link group connected in series with the fourth data-link group.

6. A memory system comprising:
   a memory controller;
   a first module connector adjacent the memory controller;
   a second module connector adjacent the first module connector on a side of the first module connector opposite the memory controller;
   a third module connector adjacent the second module connector on a side of the second module connector opposite the first module connector;
   a fourth module connector adjacent the third module connector on a side of the third module connector opposite the second module connector;
   a first data-link group of first data links, each first data link a wired connection from the memory controller to the first module connector and the third module connector, the first data-link group extending past the second module connector;
   a second data-link group of second data links, each second data link a wired connection extending past the first module connector and the third module connector, the second data-link group coupling the memory controller to the second module connector and the fourth module connector;
   a third data-link group extending between the first module connector and the second module connector; and
   a fourth data-link group extending between the third module connector and the fourth module connector.

7. The memory system of claim 6, further comprising a first memory module connected to the first module connector and a second memory module connected to the second module connector, the memory controller to direct a memory transaction to the first memory module and the second memory module via the respective first data-link group and the second data-link group.

8. The memory system of claim 7, further comprising a third memory module connected to the third module connector and a fourth memory module connected to the fourth module connector, the memory controller to direct the memory transaction to the third memory module and the fourth memory module via the respective second data-link group and the first data-link group.

9. The memory system of claim 7, each of the module connectors including an arrangement of pin groups, including a first pin group and a second pin group;
- the first data-link group connected to the first pin group of the first module connector and the second data-link group connected to the second pin group of the second module connector;
- the first memory module including a first data-buffer component to steer first data from the first memory module to the first pin group on the first memory module responsive to a read command; and
- the second memory module including a second data-buffer component to steer second data from the second memory module to the second pin group of the second memory module responsive to the read command.

10. The memory system of claim 9, further comprising:
- a third memory module connected to the third module connector; and
- a fourth memory module connected to the fourth module connector;
- the first data-link group connected to the first pin group of the third module connector and the second data-link group connected to the second pin group of the fourth module connector; and
- the memory system steering data from the third memory module to the first pin group on the third memory module responsive to the read command and steering data from the fourth memory module to the second pin group of the fourth memory module responsive to the read command.

11. The memory system of claim 6, each of the module connectors including an arrangement of pin groups, including a first pin group and a second pin group, the first data-link group connected to the first pin group of the first module connector and the second data-link group connected to the first pin group of the second module connector.

12. The memory system of claim 6, each of the module connectors including an arrangement of pin groups, including a first pin group and a second pin group, the first data-link group connected to the first pin group of the first module connector and the second data-link group connected to the second pin group of the second module connector.

* * * * *